(12) United States Patent
Sekhar

(10) Patent No.: US 12,730,924 B1
(45) Date of Patent: Sep. 8, 2026

(54) METHOD AND SYSTEM FOR OUTSOURCING DECISION-TREE INFERENCE WHILE OBFUSCATING DECISION-TREE ATTRIBUTES

(71) Applicant: Pantherun Technologies Private Limited, Bangalore (IN)

(72) Inventor: Srinivas Lakshman Sekhar, Bangalore (IN)

(73) Assignee: Pantherun Technologies Private Limited, Bangalore (IN)

( * ) Notice: Subject to any disclaimer, the term of this patent is extended or adjusted under 35 U.S.C. 154(b) by 0 days.

(21) Appl. No.: 19/432,517

(22) Filed: Dec. 24, 2025

(30) Foreign Application Priority Data

May 26, 2025 (IN) ............................. 202541050716

(51) Int. Cl.
*G06F 16/00* (2019.01)
*G06F 21/62* (2013.01)
*G06N 5/04* (2023.01)

(52) U.S. Cl.
CPC ........... *G06F 21/6227* (2013.01); *G06N 5/04* (2013.01)

(58) Field of Classification Search
CPC ............................. G06F 16/00; G06F 21/6227
See application file for complete search history.

(56) References Cited

U.S. PATENT DOCUMENTS

2019/0258694 A1* 8/2019 Woo ........................ G06F 17/16

OTHER PUBLICATIONS

Harikrishnan N.B. et al., “Permutation Decision Trees,” Researchgate. Net, Jun. 5, 2023, pp. 1-10. (Year: 2023).*
Abraham Waksman, “A Permutation Network,” Journal of the ACM (JACM), vol. 15, Issue 1, Jan. 1968, pp. 1-6. (Year: 1968).*
First Examination Report issued for Indian Patent Application No. 202541050716, dated Jun. 30, 2025, 7 pages.
Kun Liu, et al., “Secure Two-Party Decision Tree Classification Based on Function Secret Sharing”, Hindawi Complexity, vol. 2023, Article ID 5302915, Oct. 31, 2023, 13 pages. Available at: https://doi.org/10.1155/2023/5302915.

* cited by examiner

*Primary Examiner* — Cheryl Lewis
(74) *Attorney, Agent, or Firm* — Barta Jones. PLLC

(57) ABSTRACT

A method and a system for outsourcing decision tree inference involving decision tree attribute obfuscation. Embodiments provide a privacy-preserving outsourced decision tree classification framework that incorporates an attribute-hiding mechanism to obfuscate attributes of nodes of a decision tree model, which is to be inferred for classification task based on a query data. Embodiments provide the framework that ensures robust protection of the attributes of the decision tree model, addresses transmission overhead issues associated with transmission of a share of the query data from the first device to the second device (by employing a seed-based pseudorandom generator for compressing the share of the query data), ensures enhanced privacy for users, and improves scalability for practical deployment in resource-constrained environments.

15 Claims, 7 Drawing Sheets

METHOD AND SYSTEM FOR OUTSOURCING DECISION-TREE INFERENCE WHILE OBFUSCATING DECISION-TREE ATTRIBUTES

FIELD OF TECHNOLOGY

The present disclosure relates to outsourcing of decision-tree classification models/systems. Specifically, the present disclosure relates to a method and a system for outsourcing decision tree model inference while obfuscating attributes of the decision tree model.

BACKGROUND

Advancements in the field of machine learning have led to large-scale development, implementation, and widespread adoption of decision tree-based classification systems. The decision tree-based classification systems are primarily used for their interpretability, efficiency, and ability to handle both classification and regression tasks. These systems are particularly valuable and employed in scenarios where computational and storage resources are limited (such as edge devices in Internet of Things (IoT) environments). However, the computational and storage limitations of such devices often necessitate outsourcing decision tree inference to cloud-based services. This outsourcing may introduce significant privacy concerns, as both user's data and a model owner's proprietary decision tree model must be protected from unauthorized access.

To address issues surrounding securing user's privacy, privacy-preserving outsourced decision tree classification frameworks have been introduced. These frameworks employ secret sharing and pseudorandom generators to enable secure and efficient decision tree inference using service providers. These frameworks also ensure succinct communication between model owners, service providers, and end-user devices (edge devices, for example), while optimizing storage costs using one or more tree compression techniques. Furthermore, these frameworks have been able to demonstrate outstanding performance in terms of factors such as storage efficiency and reduction in both communication complexity and computational overhead, thereby making them promising candidate solutions for privacy-preserving machine learning.

However, despite its strengths, these frameworks have notable limitations. These include significant communication overhead incurred in transmission of shares of query data from the user device to the service provider. The communication overhead is proportional to the size of the query data. Furthermore, and more critically, these frameworks do not address risks associated with attribute leakage. The attributes of decision tree nodes are generally stored in plaintext in both the service providers and user device. Such storage may expose sensitive model information to unauthorized parties. This vulnerability may lead to compromising of privacy of the model owner, as adversaries could potentially reconstruct the decision tree model or infer valuable insights about its structure.

Therefore, in light of the foregoing discussion, there exists a need to overcome the aforementioned drawbacks associated with the privacy-preserving outsourced decision tree classification frameworks.

SUMMARY

The present disclosure provides a first device (a user device), a second device (a service provider device), a method, and a system for outsourcing inference of a decision tree model and obfuscating attributes of the decision tree during the inference. The present disclosure further provides a privacy-preserving outsourced decision tree classification framework that incorporates an attribute-hiding mechanism to obfuscate attributes of nodes of a decision tree model that is to be inferred for classification based on a query data. An aim of the present disclosure is to provide the framework that ensures robust protection of the attributes of the decision tree model, addresses transmission overhead issues associated with transmission of a share of the query data from the first device to the second device (by employing a seed-based pseudorandom generator for compressing the share of the query data), ensures enhanced privacy for end-users, and improves scalability for practical deployment in resource-constrained devices and environments.

In a first aspect, the present disclosure provides the first device that is configured to obtain a permuted query data from an original query data comprising a sequence of attribute values, wherein the sequence of attribute values is altered based on a permutation matrix to obtain the permuted query data. The first device is further configured to generate two shares of the permuted query data, wherein a first share of the permuted query data is stored in the first device. The first device is further configured to transmit a first seed to a second device to enable the second device to generate a second share of the permuted query data using the first seed. The first device is further configured to receive a first share of the permutation matrix from a third device, wherein the second device receives a second share of the permutation matrix from the third device. The first device is further configured to generate a first share of a fully permuted query data based on the first share of the permuted query data, the first share of the permutation matrix, a masked version of the second share of the permuted query data and a masked version of the second share of the permutation matrix. The first device is further configured to transmit, to the second device, a masked version of the first share of the permuted query data and a masked version of the first share of the permutation matrix to enable the second device to generate a second share of the fully permuted query data, wherein the generation is further based on the second share of the permuted query data and the second share of the permutation matrix. The first device is further configured to receive a second seed from the third device, wherein the second seed is used to compute first shares of thresholds associated with a set of non-leaf nodes of a first share of a permuted decision tree, and wherein second shares of the thresholds associated with a set of corresponding non-leaf nodes of a second share of the permuted decision tree are received by the second device from the third device. The first device is further configured to receive a second share of a classification result from the second device, wherein the second share of the classification result is generated based on outcomes of secure comparison operations, and wherein the second device performs the secure comparison operations based on masked versions of each of second shares of the thresholds associated with the set of corresponding non-leaf nodes, the second share of the fully permuted query data, the first shares of the thresholds associated with the set of non-leaf nodes, and the first share of the fully permuted query data. The first device is further configured to receive, from the second device, outcomes of the secure comparison operations. The first device is further configured to generate a first share of the classification result based on the outcomes of the secure comparison operations. The first device is further configured to generate a decision tree classification result based on the first share of the classification result and the second share of the classification result.

In a second aspect, the present disclosure provides the second device that is configured to receive a first seed from the first device. The second device is further configured to generate a second share of the permuted query data using the first seed, wherein the first device generates, based on application of additive secret sharing on a permuted query data, a first share of the permuted query data and the second share of the permuted query data, wherein the first device obtains the permuted query data from an original query data comprising a sequence of attribute values, and wherein the sequence of attribute values is altered based on a permutation matrix to generate the permuted query data. The second device is further configured to receive a second share of the permutation matrix from a third device, wherein the first device receives a first share of the permutation matrix from the third device. The second device is further configured to receive, from the first device, a masked version of the first share of the permuted query data and a masked version of the first share of the permutation matrix. The second device is further configured to generate a second share of a fully permuted query data based on the second share of the permuted query data, the second share of the permutation matrix, the masked version of the first share of the permuted query data and the masked version of the first share of the permutation matrix. The second device is further configured to transmit, to the first device, a masked version of the second share of the permuted query data and a masked version of the second share of the permutation matrix to enable the first device to generate a first share of the fully permuted query data, wherein the generation is further based on the first share of the permuted query data and the first share of the permutation matrix. The second device is further configured to receive second shares of the thresholds associated with a set of corresponding non-leaf nodes of a second share of the permuted decision tree from the third device, wherein the first device receives a second seed from the third device, and wherein the first device uses the second seed to compute first shares of thresholds associated with a set of non-leaf nodes of a first share of a permuted decision tree. The second device is further configured to receive masked versions of the first shares of the thresholds associated with the set of non-leaf nodes and a masked version of the first share of the fully permuted query data. The second device is further configured to generate a second share of a classification result based on outcomes of secure comparison operations, wherein the secure comparison operations are performed based on masked versions of each of the second shares of the thresholds associated with the set of non-leaf nodes, the second share of the fully permuted query data, the first shares of the thresholds associated with the set of non-leaf nodes, and the first share of the fully permuted query data. The second device is further configured to transmit the second share of the classification result and the outcomes of the secure comparison operations to the first device, wherein the first device generates a first share of the classification result based on the outcomes of the secure comparison operations, and wherein the first device generates a decision tree classification result based on the first share of the classification result and the second share of the classification result.

In a third aspect, the present disclosure provides the method for obtaining a decision-tree classification result. The method comprises obtaining, by a first device, a permuted query data from an original query data, wherein the original query data comprises a sequence of attribute values, wherein the sequence of attribute values is altered based on a permutation matrix to obtain the permuted query data. The method further comprises generating, by the first device, two shares of the permuted query data, wherein a first share of the permuted query data is stored in the first device. The method further comprises transmitting, by the first device, a first seed to a second device, wherein the first seed enables the second device to generate a second share of the permuted query data using the first seed. The method further comprises receiving, by the first device, a first share of the permutation matrix from a third device, wherein the second device receives a second share of the permutation matrix from the third device. The method further comprises generating, by the first device, a first share of a fully permuted query data, wherein the generation is based on the first share of the permuted query data, the first share of the permutation matrix, a masked version of the second share of the permuted query data, and a masked version of the second share of the permutation matrix. The method further comprises transmitting, by the first device to the second device, a masked version of the first share of the permuted query data and a masked version of the first share of the permutation matrix, wherein the transmission enables the second device to generate a second share of the fully permuted query data, and wherein the generation is further based on the second share of the permuted query data and the second share of the permutation matrix. The method further comprises receiving, by the first device, a second seed from the third device, wherein the second seed is used for computing first shares of thresholds associated with a set of non-leaf nodes of a first share of a permuted decision tree, and wherein second shares of the thresholds associated with a set of corresponding non-leaf nodes of a second share of the permuted decision tree are received by the second device from the third device. The method further comprises receiving, by the first device, a second share of a classification result from the second device, wherein the second share of the classification result is generated based on outcomes of secure comparison operations, and wherein the second device performs the secure comparison operations based on masked versions of each of the second shares of the thresholds associated with the set of corresponding non-leaf nodes, the second share of the fully permuted query data, the first shares of the thresholds associated with the set of non-leaf nodes, and the first share of the fully permuted query data. The method further comprises receiving, by the first device, outcomes of the secure comparison operations from the second device. The method further comprises generating, by the first device, a first share of the classification result based on the outcomes of the secure comparison operations. The method further comprises generating, by the first device, a decision tree classification result based on the first share of the classification result and the second share of the classification result.

In a fourth aspect, the present disclosure provides the system that comprises the first device, the second device, and the third device. The first device comprises a first processor, the second device comprises a second processor, and the third device comprises a third processor. The third device is configured to transmit an attribute sequence vector to the first device to enable the first device to generate a permuted query data. The third device is further configured to transmit a first share of a permutation matrix to the first device and a second share of the permutation matrix to the second device, wherein the third device applies an additive secret sharing on the permutation matrix leading to a splitting of the permutation matrix into the first share of the permutation matrix and the second share of the permutation matrix. The third device is further configured to obtain a permuted decision tree, wherein each non-leaf node of the permuted decision tree includes an attribute and a threshold. The third device is further configured to split the permuted decision tree into a first share of the permuted decision tree and a second share of the permuted decision tree. The third device is further configured to transmit a second seed to the first device to enable the first device to compute first shares of thresholds associated with a set of non-leaf nodes of the first share of a permuted decision tree. The third device is further configured to transmit the second share of the permuted decision tree to the second device, wherein non-leaf nodes of the second share of the permuted decision tree include second shares of the thresholds and attributes associated with the non-leaf nodes, and wherein leaf nodes of the second share of the permuted decision tree include labels.

It has to be noted that all devices, elements, processors, units, and modules described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not too scaled. Wherever possible, like elements have been indicated by identical numbers.

Embodiments of the present disclosure will now be described, by way of example, with reference to the following diagrams, wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF THE DISCLOSURE

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
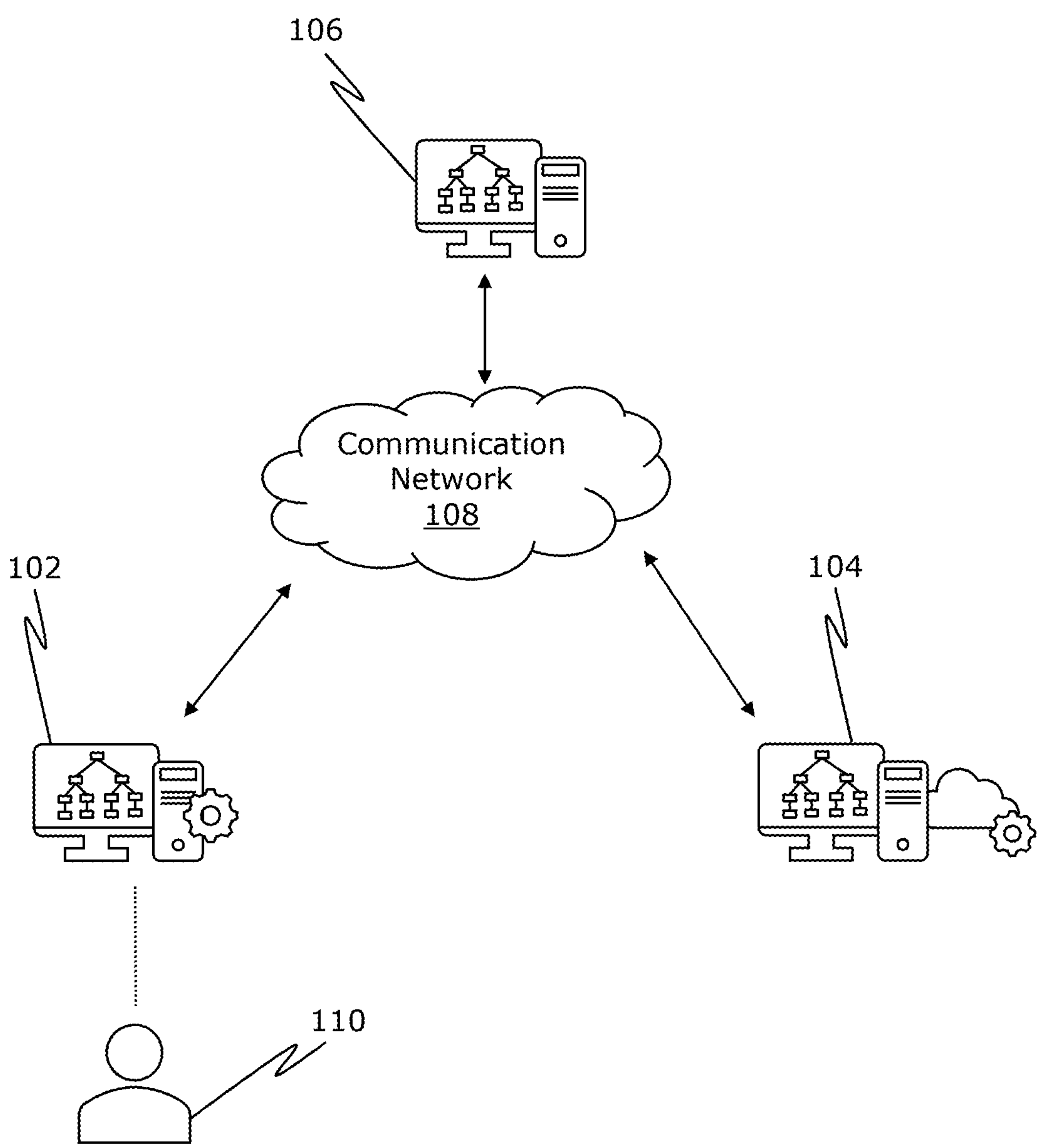
FIG. 1 illustrates an exemplary networking environment where outsourcing inference of a decision tree model and obfuscating attributes of the decision tree model during inference are implemented, in accordance with an embodiment of the present disclosure.

FIG. 1 illustrates an exemplary networking environment 100 where outsourcing inference of a decision tree model and obfuscating attributes of the decision tree model during inference are implemented, in accordance with an embodiment of the present disclosure. With reference to FIG. 1, there is shown the networking environment 100. The networking environment 100 includes a set of entities. The set of entities include a first device 102, a second device 104, and a third device 106. The first device 102, the second device 104, and the third device 106 may communicate with each other via a communication network 108. The third device 106 functions as a model owner as it owns a decision tree classification model. The first device 102 is a user device associated with a user 110. The first device 102 generates query data using which inference of the decision tree classification model is to be carried out. The first device 102 outsources inference of the decision tree classification model to the second device 104. The second device 104 functions as a service provider device that performs a majority of computations for generation of a decision tree classification result with respect to the query data generated by the first device 102.

The communication network 108 includes a medium (such as a communication channel) through which the set of entities (i.e., the first user device 102, the second user device 104, and the third user device 106) communicate with each other. The communication network 108 may be a wired/wireless network. Examples of the communication network 108 may include, but are not limited to, a local area network (LAN), a wireless personal area network (WPAN), a wireless local area network (WLAN), a wireless wide area network (WWAN), a cloud network, a long-term evolution (LTE) network, a New Radio (NR) network, a metropolitan area network (MAN), and/or Internet.

The second device 104, for example, a cloud service provider (CSP), may handle most of the computations for generating the decision tree classification result. The first device 102, i.e., the user device, has limited computational and storage resources. Hence, the first device 102 may outsource classification tasks associated with inferencing of the decision tree classification model to the second device 104 by leveraging robust and low-latency infrastructure of the communication network 108. The first device 104 cooperates with the CSP for generation of the decision tree classification result. Examples of the first device 102 include, but are not limited to, a smartphone, a desktop, a laptop, a tablet, a smart watch, a smart camera, a home security system, a smart thermostat, a smart lighting system, a fitness tracker, a smart meter, a health monitoring device, a quality control system, and so on.

As mentioned previously, the third device 106, i.e., the model owner, owns a trained decision tree classification model. For obfuscating attributes of the decision tree classification model, the third device 106 permutes the decision tree classification model. Transmission of the permuted decision tree classification model prevents attribute leakage once shares of the permuted decision tree classification model are distributed to the first device 102 and the second device 104. To generate the permuted decision tree classification model, the third device 106 defines a vector "$v_b$", which is indicative of a sequence of attributes, and a secret permutation matrix "A". Based on a product of "A" and "$v_b$", an attribute sequence vector "V" is generated. The attribute sequence vector, i.e., "V", is a permuted sequence of attributes. Based on "V", the third device 106 permutes the decision tree classification model for generation of the permuted decision tree classification model.

The permutation involves changing depth levels of non-leaf nodes of the decision tree classification model in accordance with "V". The permutation leads to obfuscation of attributes as the attributes associated with the non-leaf nodes are updated after the permutation. Thereafter, the third device 106 splits the permuted decision tree classification model to generate a first share of the permuted decision tree classification model and a second share of the permuted decision tree classification model. The splitting causes thresholds associated with non-leaf nodes of the permuted decision tree classification model to be split as well. For example, a sum of a first share of a threshold associated with a non-leaf node in the first share of the permuted decision tree classification model and a second share of the threshold associated with a corresponding non-leaf node in the second share of the permuted decision tree classification model is equal to a threshold of the non-leaf node of the permuted decision tree classification model. Hereinafter, for simplicity, the permuted decision tree classification model will be referred to as the permuted decision tree. The third device 106 distributes the first share of the permuted decision tree to the first device 102 and the second share of the permuted decision tree to the second device 104.

Furthermore, the third device 106 transmits the attribute sequence vector, i.e., "V", to the first device 102. Based on "V", the first device 102 permutes an original query data "x". The original query data includes a sequence of attribute values that corresponds to the sequence of attributes. The sequence of attribute values is altered based on "V" for generation of permuted query data "x'". This involves relocating each attribute value in the original query data in accordance with "V". Thus, there is transformation $x \rightarrow x'$.

The third device 106 further applies an additive secret sharing on the permutation matrix "A", leading to a splitting of the permutation matrix into a first share of the permutation matrix "$[A]_0$" and a second share of the permutation matrix "$[A]_1$". The third device 106 transmits "$[A]_0$" to the first device 102 and "$[A]_1$" to the second device 104. The first device 102 also applies the additive secret sharing on "x'" (i.e., the permuted query data), leading to a splitting of the permuted query data into a first share of the permuted query data "$[x']_0$" and a second share of the permuted query data "$[x']_1$". To reduce transmission cost (i.e., communication overhead) involved in sending the second share of the permuted query data "$[x']_1$" to the second device 104, the first device 102 transmits the first seed to the second device 104. Based on the first seed, the second device 104 constructs the second share of the permuted query data "$[x']_1$" at its end. Thus, a transmission cost involved in sending the share of the permuted query data is reduced to a constant value. Reception of "$[A]_0$" from the third device 106 enables the first device 102 to generate a first share of fully permuted query data "$[x'^{(A)}]_0$" from "$[x']_0$". Furthermore, reception of "$[A]_1$" from the third device 106 enables the second device 104 to generate a second share of fully permuted query data "$[x'^{(A)}]_1$" from "$[x']_1$".

The third device 106 further transmits a second seed to the first device 102. The second seed enables the first device 102 to compute first shares of thresholds associated with a set of non-leaf nodes of the first share of the permuted decision tree. This allows reducing communication overhead which might otherwise be involved in transmitting the first shares of the thresholds associated with the non-leaf nodes of the first share of the permuted decision tree to the first device 102. The third device 106 further transmits second shares of the thresholds associated with a set of corresponding non-leaf nodes of the second share of the permuted decision tree to the second device 104.

The second device 106 performs a number of secure comparison operations based on the first shares of thresholds, the second shares of the thresholds, "$[x'^{(A)}]_0$", and "$[x'^{(A)}]_1$". Based on outcomes of the secure comparison operations, the second device 106 determines a second share of a classification result. It is to be noted that the secure comparison may be performed a predefined number of times, that is equal to a depth of the permuted decision tree. The performance of the secure comparison operations allows traversing the second share of the permuted decision tree. The second share of a classification result is obtained as outcome of a final secure comparison operation and involves reaching a leaf node of the second share of the permuted decision tree. The second device 106 further transmits outcomes of the secure comparison operations and the second share of the classification result to the first device 102. The performance of the secure comparison operations by the second device 104 corresponds to outsourcing of decision tree inference by the first device 102.

The first device 102 determines a first share of the classification result based on outcomes of the secure comparison operations. Based on the outcomes of the secure comparison operations, the first device 102 traverses the first share of the permuted decision tree. The first share of the classification result is obtained as the outcome of the final secure comparison operation and involves reaching a leaf node of the first share of the permuted decision tree. Based on the first share of the classification result and the second share of the classification result, the first device 102 generates a decision tree classification result.

FIG. 1 merely depicts an exemplary networking environment 100, which should not unduly limit the scope of the disclosure. Persons skilled in the art can recognize many variations, alternatives, and modifications of embodiments of the present disclosure.

Figure 2:
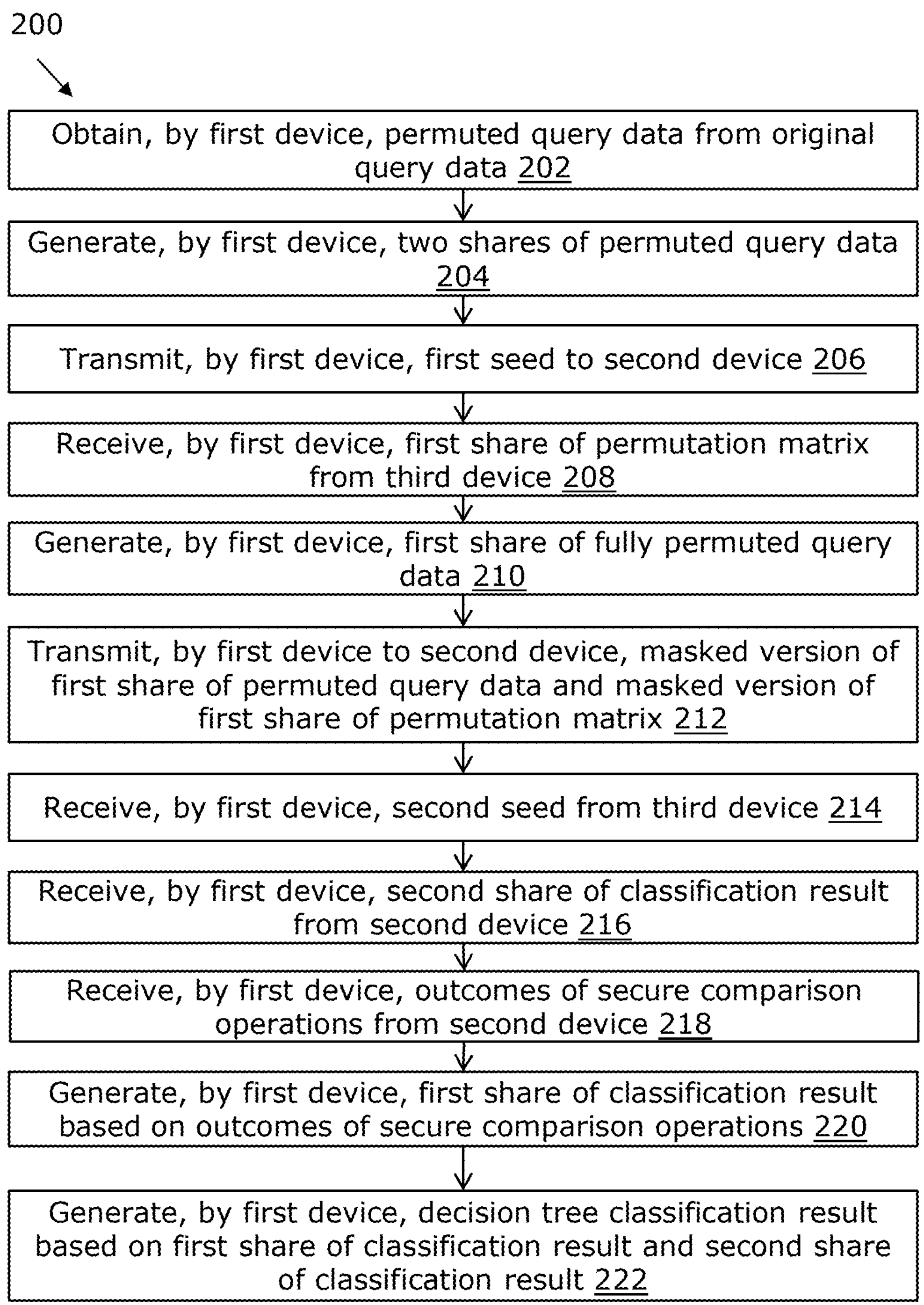
FIG. 2 is a flowchart that illustrates steps of a method for outsourcing decision tree inference while obfuscating decision tree attributes, in accordance with an embodiment of the present disclosure.

FIG. 2 is a flowchart 200 that illustrates steps of a method for outsourcing decision tree inference while obfuscating decision tree attribute, in accordance with an embodiment of the present disclosure. FIG. 2 is described in conjunction with elements from FIG. 1. With reference to FIG. 2, there is shown the flowchart 200. The flowchart 300 includes steps 202-222. The first device 102 is configured to execute the method for outsourcing decision tree inference while involving decision tree attribute obfuscation.

At step 202, the method includes obtaining, by use of the first device 102, a permuted query data from an original query data. The original query data comprises a sequence of attribute values. The sequence of attribute values is altered based on a permutation matrix to generate the permuted query data. At step 204, the method includes generating, by use of the first device 102, two shares of the permuted query data. A first share of the permuted query data is stored in the first device 102. At step 206, the method includes transmitting, by use of the first device 102, a first seed to the second device 104. The first seed enables the second device 104 to generate a second share of the permuted query data using the first seed. At step 208, the method includes receiving, by use of the first device 102, a first share of the permutation matrix from the third device 106. The second device 104 receives a second share of the permutation matrix from the third device 106. At step 210, the method includes generating, by use of the first device 102, a first share of a fully permuted query data. The generation is based on the first share of the permuted query data, the first share of the permutation matrix, a masked version of the second share of the permuted query data, and a masked version of the second share of the permutation matrix. The first device 102 receives the masked version of the second share of the permuted query data and the masked version of the second share of the permutation matrix from the second device 104.

At step 212, the method includes transmitting, by use of the first device 102, a masked version of the first share of the permuted query data and a masked version of the first share of the permutation matrix to the second device 104. The transmission enables the second device 104 to generate a second share of the fully permuted query data. The generation is further based on the second share of the permuted query data and the second share of the permutation matrix. At step 214, the method includes receiving, by use of the first device 102, a second seed from the third device 106. The second seed is used for computing first shares of thresholds associated with a set of non-leaf nodes of a first share of a permuted decision tree. Furthermore, second shares of the thresholds associated with a set of corresponding non-leaf nodes of a second share of the permuted decision tree are received by the second device 104 from the third device 106. At step 216, the method includes receiving, by use of the first device 102, a second share of a classification result from the second device 104. The second share of the classification result is generated based on outcomes of secure comparison operations. The second device 104 performs the secure comparison operations based on masked versions of each of the second shares of the thresholds associated with the set of corresponding non-leaf nodes, the second share of the fully permuted query data, the first shares of the thresholds associated with the set of non-leaf nodes, and the first share of the fully permuted query data.

At step 218, the method includes receiving, by use of the first device 102, outcomes of the secure comparison operations from the second device 104. At step 220, the method includes generating, by use of the first device 102, a first share of the classification result based on the outcomes of the secure comparison operations. At step 222, the method includes generating, by the first device 102, a decision tree classification result based on the first share of the classification result and the second share of the classification result.

The steps 202-222 are illustrative, and other alternatives can also be provided where one or more steps are added, one or more steps are provided in a different sequence, or one or more steps are eliminated, without departing from the scope of the claims herein.

There is provided a computer program comprising instructions for carrying out all the steps of the method. The computer program is executed on the first device 102. The computer program is implemented as an algorithm, embedded in a software stored in the non-transitory computer-readable storage medium that has program instructions stored thereon, the program instructions being executable by the one or more processors in the computer system to execute the method illustrated using the flowchart 200. The non-transitory computer-readable storage means may include, but are not limited to, an electronic storage device, a magnetic storage device, an optical storage device, an electromagnetic storage device, a semiconductor storage device, or any suitable combination of the foregoing. Examples of implementation of computer-readable storage medium, but are not limited to, an Electrically Erasable Programmable Read-Only Memory (EEPROM), a Random Access Memory (RAM), a Read Only Memory (ROM), a Hard Disk Drive (HDD), a Flash memory, a Secure Digital (SD) card, a Solid-State Drive (SSD), a computer-readable storage medium, and/or a CPU cache memory.

Figure 3:
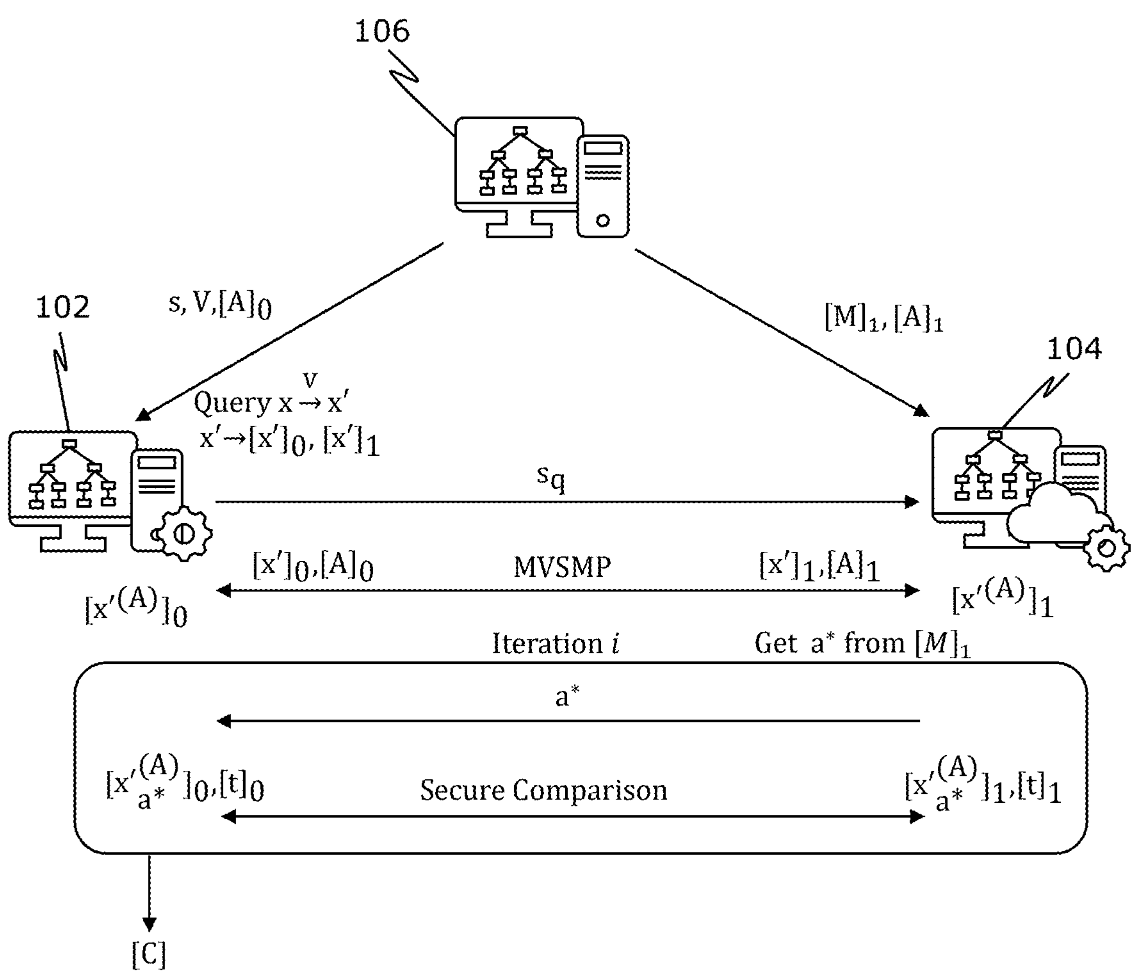
FIG. 3 illustrates information exchange between entities of the networking environment for outsourcing inference of a decision tree classification model and obfuscating attributes of the decision tree classification model during the inference, in accordance with an embodiment of the present disclosure.

FIG. 3 illustrates information exchange between entities of the networking environment 100 for outsourcing inference of a decision tree classification model and obfuscating attributes of the decision tree classification model during the inference, in accordance with an embodiment of the present disclosure. FIG. 3 is described in conjunction with elements from FIG. 1 and FIG. 2. With reference to FIG. 3, there is shown the information exchange between the first device 102, the second device 104, and the third device 106 (the entities of the networking environment 100). The third device 106 defines an attribute sequence vector "V". The attribute sequence vector "V" is a permuted sequence of attributes. The permuted sequence of attributes is a vector that may be obtained based on an outcome of a product of a permutation matrix "A" (generated by the third device 106) and a matrix including a sequence of attributes "$v_b$". For example, the sequence of attributes may be [$a_1$, $a_2$, $a_3$], were $a_1$ is a first attribute, $a_2$ is a second attribute, and $a_3$ is a third attribute. Furthermore, the permutation matrix, i.e., "A" may be as follows:

$$A = \begin{bmatrix} A_{11} & A_{12} & A_{13} \\ A_{21} & A_{22} & A_{23} \\ A_{31} & A_{32} & A_{33} \end{bmatrix} = \begin{bmatrix} 0 & 1 & 0 \\ 0 & 0 & 1 \\ 1 & 0 & 0 \end{bmatrix}$$

Thus, the product of A and $v_b$ (i.e., attribute sequence vector or "V") is [$a_2$, $a_3$, $a_1$]. Based on "V", the third device 106 may obtain a permuted decision tree M' (i.e., the decision tree classification model) from an original decision tree "M", i.e., original decision tree classification model. The permuted decision tree is obtained, i.e., the original decision tree is permuted, in order to obfuscate attributes of the original decision tree. Nodes of "M" are associated with attributes. For instance, a root node of "M" is associated with the first attribute, first nodes signifying children of the root node are associated with the second attribute, and second nodes signifying children of the first nodes are associated with the third attribute. Based on the abovementioned example of "V", i.e., $[a_2, a_3, a_1]$, the original decision tree is permuted such that a root of the permuted decision tree M' is associated with the second attribute, first nodes signifying children of the root node is associated with the third attribute, and second nodes signifying children of the first nodes is associated with the first attribute.

The third device 106 may split a permuted decision tree (M'), i.e., the decision tree classification model, to generate shares of the permuted decision tree. The shares include a first share of the permuted decision tree $[M']_0$ and a second share of the permuted decision tree $[M']_1$. The splitting is such that a threshold associated with each non-leaf node of M' is split into a first share of threshold and a second share of threshold based on additive secret sharing. Thus, an accumulation of the first share of threshold and the second share of the threshold is equal to the threshold. In other words, a sum of a threshold associated with a non-leaf node of $[M']_0$ and a threshold associated with a corresponding non-leaf node of $[M']_1$ is equal to the threshold.

Furthermore, the third device 106 splits the permutation matrix, i.e., "A", into a first share of the permutation matrix "$[A]_0$" and a second share of the permutation matrix "$[A]_1$". The first share of the permutation matrix and the second share of the permutation matrix are obtained by the third device 106 based on an application of an additive secret sharing on the permutation matrix. The application leads to the splitting of the permutation matrix into the first share of the permutation matrix, i.e., "$[A]_0$" and the second share of the permutation matrix, i.e., "$[A]_1$". Each of the permutation matrix, the first share of the permutation matrix, and the second share of the permutation matrix is a square matrix. Thus, if "A" is a 3×3 matrix, then each of "$[A]_0$" and "$[A]_1$" is a 3×3 matrix.

Thereafter, the third device 106 may transmit the attribute sequence vector, i.e., "V" and the first share of the permutation matrix "$[A]_0$" to the first device 102. The third device 106 may further transmit the second share of the permutation matrix "$[A]_1$" and the second share of the permuted decision tree $[M']_1$ to the second device 104. It may be noted that the third device 106 does not transmit the first share of the permuted decision tree $[M']_0$ to the first device 102. This is primarily to preserve memory (which is limited) of the first device 102. Upon reception of the attribute sequence vector, i.e., "V", the first device 102 alters a sequence of attribute values constituting an original query data [x] based on the permuted sequence of attributes (i.e., the attribute sequence vector "V"). For example, the original query data constituting the sequence of attribute values is [x(0), x(1), x(2)], wherein x(0) is an attribute value of the first attribute, x(1) is an attribute value of the second attribute, and x(2) is an attribute value of the third attribute. If "V" is $[a_2, a_3, a_1]$, then elements of "x", i.e., x(0), x(1), and x(2), are relocate in accordance to "V". Thus, the sequence of attribute values is altered to obtain a permuted query data "x". The permuted query data is [x(1), x(2), x(0)]. It is to be noted that number of rows and a number of columns in each of the permutation matrix "A", the first share of the permutation matrix "$[A]_0$", and the second share of the permutation matrix "$[A]_1$" is equal to a number of elements in the permuted query data "x'". For example, if the number of rows and the number of columns in each of "A", "$[A]_0$", and "$[A]_1$" is 3, then "x'" includes three elements.

The first device 102 applies the additive secret sharing on the permuted query data "x'" to split the permuted query data into two parts. The split leads to the generation of a first share of the permuted query data "$[x']_0$" and a second share of the permuted query data "$[x']_1$". Each of the permuted query data, the first share of the permuted query data, and the second share of the permuted query data is a matrix that includes one column and a number of rows equal to the number of elements in the permuted query data. For example, if $[x']=[x(1), x(2), x(0)]^T$, then "$[x']_0$", i.e., the first share of the permuted query data, is $[\{x(1)\}_0, \{x(2)\}_0, \{x(0)\}_0]^T$ and "$[x']_1$", i.e., the second share of the permuted query data is $[\{x(1)\}, \{x(2)\}, \{x(0)\}_1]^T$. The number of rows is 3 and the number of columns is 1, and the number of rows is equal to the number of elements in "x'", i.e., 3. Furthermore, number of elements, (for example, 3), included in each of the first share of the permuted query data and the second share of the permuted query is equal to the number of elements in the permuted query data (for example, 3).

The first device 102 generates a first seed "$s_q$" such that it is possible to generate second share of the permuted query data "$[x']_1$" using the first seed. The first device 102 transmits "$s_q$" to the second device 104 to enable the second device 104 to generate the second share of the permuted query data "$[x']_1$" using "$s_q$". This reduces significant transmission overhead involved in transmitting "$[x']_1$" from the first device 102 to the second device 104. The second device 104 may apply a pseudo-random generator (PRNG) on the first seed to generate a first element of the second share of the permuted query data. Thus, an outcome of PRNG ($s_q$) is $\{x(1)\}_1$. Furthermore, an application of the PRNG on the first element leads to a generation of a second element of the second share of the permuted query data. Thus, an outcome of PRNG ($\{x(1)\}_1$) is $\{x(2)\}_1$. Furthermore, an application of the PRNG on a second-last element of the permuted query data leads to a generation of a last element of the second share of the permuted query data. Thus, an outcome of PRNG ($\{x(2)\}_1$) is $\{x(0)\}_1$.

The second device 104 masks each element (such as $\{x(1)\}_1$) of the second share of the permuted query data "$[x']_1$" to obtain a masked version of the second share of the permuted query data. Furthermore, the second device 104 masks each element of the second share of the permutation matrix "$[A]_1$" to obtain a masked version of the second share of the permutation matrix. Thereafter, the second device 104 transmits the masked version of the second share of the permuted query data and the masked version of the second share of the permutation matrix to the first device 102. The first device 102 receives the masked version of the second share of the permuted query data and the masked version of the second share of the permutation matrix and generates a first share of a fully permuted query data $[x'^{(A)}]_0$. The generation is based on the first share of the permuted query data "$[x']_0$", the first share of the permutation matrix "$[A]_0$", the masked version of the second share of the permuted query data and the masked version of the second share of the permutation matrix.

In an embodiment, the first share of the fully permuted query data $[x'^{(A)}]_0$ is a first share of a product of the permutation matrix and the permuted query data "$[A*x']_0$". Thus, the fully permuted query data $[x'^{(A)}]$ is a product of the permutation matrix and the permuted query data "$[A*x']$". The first share of the fully permuted query data $[x'^{(A)}]_0$ is generated by computing the first share of the product of the permutation matrix and the permuted query data, i.e., "$[A*x']_0$". The computation is based on a matrix-vector secure multiplication protocol.

The computation of an element of the first share of the fully permuted query data "$[A*x']_0$" is performed based on all elements of the first share of the permuted query data, i.e., $\{x(1)\}$, $\{x(2)\}_0$, and $\{x(0)\}_0$, and a set of elements of the first share of the permutation matrix. The set of elements may be all elements of a first row of the first share of the permutation matrix, i.e., $[A_{11}]_0$, $[A_{12}]_0$, and $[A_{13}]_0$. The computed element may be a first element of the first share of the fully permuted query data "$[A*x']_0$". Similarly, the set of elements may be all elements of a second row of the first share of the permutation matrix, i.e., $[A_{21}]_0$, $[A_{22}]_0$, and $[A_{23}]_0$. The computed element in that case may be a second element of the first share of the fully permuted query data "$[A*x']_0$". Also, the set of elements may be all elements of a third row of the first share of the permutation matrix, i.e., $[A_{31}]_0$, $[A_{32}]_0$, and $[A_{33}]_0$. The computed element in that case may be a third element of the first share of the fully permuted query data "$[A*x']_0$".

The computation of the element is further based on a first share of a first beaver triple $[a]_0$, a first share of a second beaver triple $[b]_0$, a first share of a third beaver triple $[a*b]_0$ and all elements of the second share of the permuted query data where each element is masked by a second share of the second beaver triple $[b]_1$. Thus, each of $\{x(1)\}_1$, $\{x(2)\}_1$, and $\{x(0)\}_1$ are masked by $[b]_1$.

The computation of the element is further based on a set of elements of the second share of the permutation matrix masked by a second share of the first beaver triple $[a]_1$. Thus, if computed element is the first element of the first share of the fully permuted query data "$[A*x']_0$", then the set of elements are masked versions of all elements of a first row of the second share of the permutation matrix, i.e., $[A_{11}]_1$, $[A_{12}]_1$, and $[A_{13}]_1$. Each of $[A_{11}]_1$, $[A_{12}]_1$, and $[A_{13}]_0$ are masked by $[a]_1$. Similarly, if computed element is the second element of the first share of the fully permuted query data "$[A*x']_0$", then the set of elements are masked versions of all elements of a second row of the second share of the permutation matrix, i.e., $[A_{21}]_1$, $[A_{22}]_1$, and $[A_{23}]_1$. Each of $[A_{21}]_1$, $[A_{22}]_1$, and $[A_{23}]_1$ are masked by $[a]_1$. Also, if computed element is the third element of the first share of the fully permuted query data "$[A*x']_0$", then the set of elements are masked versions of all elements of a third row of the second share of the permutation matrix, i.e., $[A_{31}]_1$, $[A_{32}]_1$, and $[A_{33}]_1$. Each of $[A_{31}]_1$, $[A_{32}]_1$, and $[A_{33}]_1$ are masked by $[a]_1$. The first share of the fully permuted query data $[x'^{(A)}]_0$, thus, comprises the first, the second, and the third elements of the first share of the fully permuted query data "$[A*x']_0$".

The first device 102 masks each element (such as $\{x(1)\}_0$) included in the first share of the permuted query data "$[x']_0$" to generate a masked version of the first share of the permuted query data. The masking is performed by use of the first share of the second beaver triple $[b]_0$. Furthermore, the first device 102 masks each element of the first share of the permutation matrix "$[A]_1$" to obtain a masked version of the first share of the permutation matrix. The masking is performed by use of the first share of the first beaver triple $[a]_0$. Thereafter, the first device 102 transmits the masked version of the first share of the permuted query data and the masked version of the first share of the permutation matrix to the second device 104. The second device 104 receives the masked version of the first share of the permuted query data and the masked version of the first share of the permutation matrix. Thereupon, the second device 104 generates a second share of the fully permuted query data $[x'^{(A)}]_1$ based on the masked version of the first share of the permuted query data, the masked version of the first share of the permutation matrix, the second share of the permuted query data $[x']_1$, and the second share of the permutation matrix $[A]_1$.

In an embodiment, the second share of the fully permuted query data $[x'^{(A)}]_1$ is a second share of a product of the permutation matrix and the permuted query data "$[A*x']_1$". The second share of the fully permuted query data $[x'^{(A)}]_1$ is generated by computing the second share of the product of the permutation matrix and the permuted query data, i.e., "$[A*x']_1$". The computation of an element of the second share of the fully permuted query data "$[A*x']"_1$ is performed based on all elements of the second share of the permuted query data, i.e., $\{x(1)\}_1$, $\{x(2)\}_1$, and $\{x(0)\}_1$, and a set of elements of the second share of the permutation matrix. The set of elements may be all elements of the first row of the second share of the permutation matrix, i.e., $[A_{11}]_1$, $[A_{12}]_1$, and $[A_{13}]_1$. The computed element may be a first element of the second share of the fully permuted query data "$[A*x']_1$. Similarly, the set of elements may be all elements of the second row of the second share of the permutation matrix, i.e., $[A_{21}]_1$, $[A_{22}]_1$, and $[A_{23}]_1$. The computed element in that case may be a second element of the second share of the fully permuted query data "$[A*x']_1$. Also, the set of elements may be all elements of the third row of the second share of the permutation matrix, i.e., $[A_{31}]_1$, $[A_{32}]_1$, and $[A_{33}]_1$. The computed element in that case may be a third element of the second share of the fully permuted query data "$[A*x']_1$.

The computation of the element is further based on the second share of a first beaver triple $[a]_1$, the second share of the second beaver triple $[b]_1$, a second share of the third beaver triple $[a*b]_1$ and all elements included in the first share of the permuted query data where each element is masked by the first share of the second beaver triple $[b]_1$. Thus, each of $\{x(1)\}_0$, $\{x(2)\}_0$, and $\{x(0)\}_0$ are masked by $[b]$.

The computation of the element is further based on a set of elements of the first share of the permutation matrix masked by a first share of the first beaver triple $[a]_0$. Thus, if computed element is the first element of the second share of the fully permuted query data "$[A*x']_1$", then the set of elements are masked versions of all elements of the first row of the first share of the permutation matrix, i.e., $[A_{11}]_0$, $[A_{12}]_0$, and $[A_{13}]_0$. Each of $[A_{11}]_0$, $[A_{12}]_0$, and $[A_{13}]_0$ are masked by $[a]_0$. Similarly, if computed element is the second element of the second share of the fully permuted query data "$[A*x']_1$", then the set of elements are masked versions of all elements of the second row of the first share of the permutation matrix, i.e., $[A_{21}]_0$, $[A_{22}]_0$, and $[A_{23}]_0$. Each of $[A_{21}]_0$, $[A_{22}]_0$, and $[A_{23}]_0$ are masked by $[a]_0$. Also, if computed element is the third element of the second share of the fully permuted query data "$[A*x']_1$", then the set of elements are masked versions of all elements of the third row of the first share of the permutation matrix, i.e., $[A_{31}]_0$, $[A_{32}]_0$, and $[A_{33}]_0$. Each of $[A_{31}]_0$, $[A_{32}]_0$, and $[A_{33}]_0$ are masked by $[a]_0$. The second share of the fully permuted query data $[x'^{(A)}]_1$, thus, comprises the first element, the second element, and the third element. Thus, the number of elements included in each of the first share of the fully permuted query data and the second share of the fully permuted query data is equal to the number of elements in the permuted query data (for example, 3).

As discussed earlier, the third device 106 does not transmit the first share of the permuted decision tree $[M']_0$ to the first device 102. Instead, the third device 106 transmits a second seed "s" to the first device 102. The seed "s" enables the first device 102 to compute first shares of thresholds associated with a set of non-leaf nodes of the first share of the permuted decision tree $[M]_0$. Specifically, the seed enables the first device to compute a first share of a threshold associated with a root node. The computation of a first share of a threshold associated with a non-leaf node (apart from the root node) of the set of non-leaf nodes is computed based on a first share of a threshold associated with a parent non-leaf node. Also, as the third device 106 transmits the second share of the permuted decision tree $[M']_1$ to the second device 104, second shares of the thresholds associated with a set of corresponding non-leaf nodes of the second share of the permuted decision tree $[M]_1$ are received by the second device 104 from the third device 106. The second device 104 receives second shares of thresholds associated with all nodes (which includes the set of corresponding non-leaf nodes) of the second share of the permuted decision tree $[M]_1$.

After the computation of the first share of the fully permuted query data $[x'^{(A)}]_0$ and the second share of the fully permuted query data $[x'^{(A)}]_1$, the second device 104 may perform a predefined number of secure comparison operations. The secure comparison operations are performed based on masked versions of each of the second shares of the thresholds $[t]_1$ associated with the set of corresponding non-leaf nodes, the second share of the fully permuted query data $[x'^{(A)}]_1$, the first shares of the thresholds $[t]_0$ associated with the set of non-leaf nodes, and the first share of the fully permuted query data $[x'^{(A)}]_0$. Each secure comparison is performed using masked versions of each of a first share of a threshold associated with a non-leaf node of the set of non-leaf nodes, an element of the first share of the fully permuted query data, a second share of the threshold associated with a corresponding non-leaf node of the set of corresponding non-leaf nodes, and an element of the second share of the fully permuted query data. The performance of the secure comparison operations is discussed in detail in FIG. 4.

The secure comparison operations are performed to traverse the second share of the permuted decision tree $[M]_1$ from a root node of $[M]_1$ to a leaf node of $[M]_1$ associated with a label. The second device 104 determines the leaf node of $[M]_1$ based on an outcome obtained at a final iteration of the secure comparison operation. The second device 104 may transmit, to the first device 102, an outcome obtained at each iteration of the secure comparison operation. Based on the outcomes, the first device 102 may construct a portion of the first share of the permuted decision tree $[M]_0$ and traverse through $[M]_0$ from a root node of $[M]_0$ to a leaf node of $[M]_0$ associated with a label. The first device 102 generates a first share of a classification result $[c]_0$ based on the label with which the leaf node of $[M]_0$ is associated. The second device 104 generates a second share of the classification result $[c]_1$ based on the label with which the leaf node of $[M]_1$ is associated. Thereafter, the second device 104 transmits the second share of the classification result $[c]_1$ to first device 102. The first device 102 generates a decision tree classification result based on the first share of the classification result $[c]_0$ and the second share of the classification result $[c]_1$.

Figure 4A:
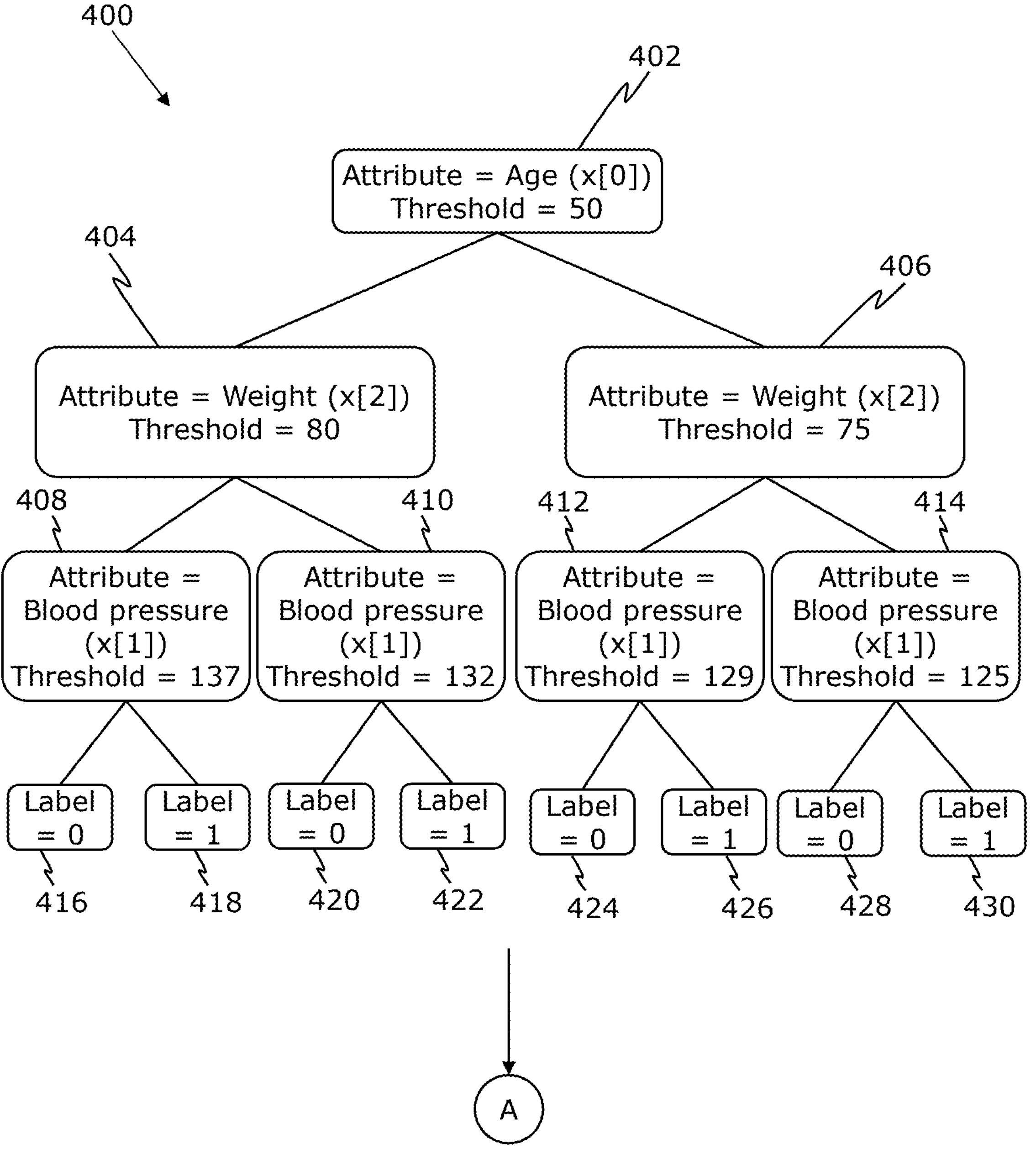
FIGS. 4A-4C illustrate an exemplary permuted decision tree classification model and its shares, in accordance with an embodiment of the present disclosure.
Figure 4B:
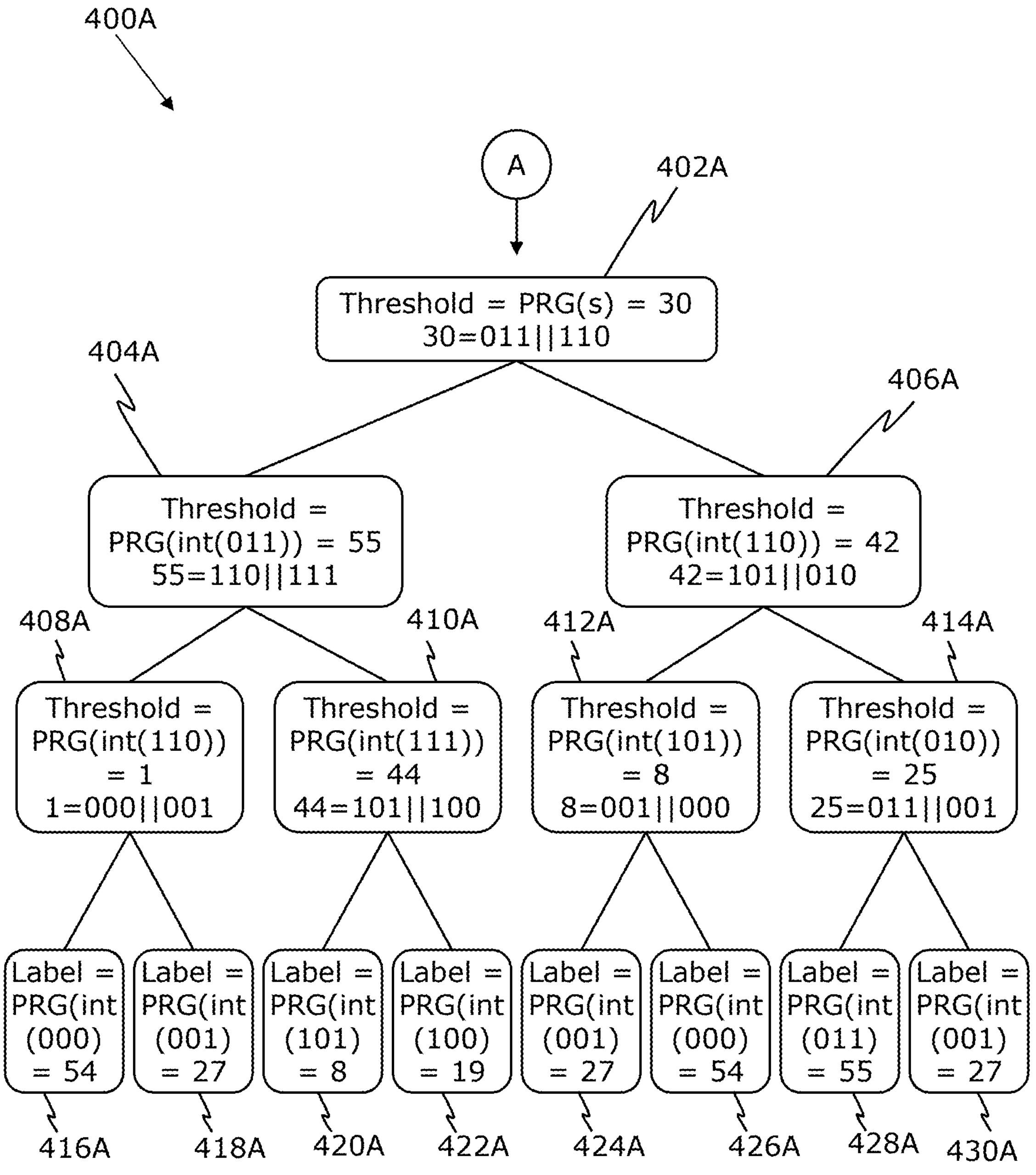
Figure 4C:
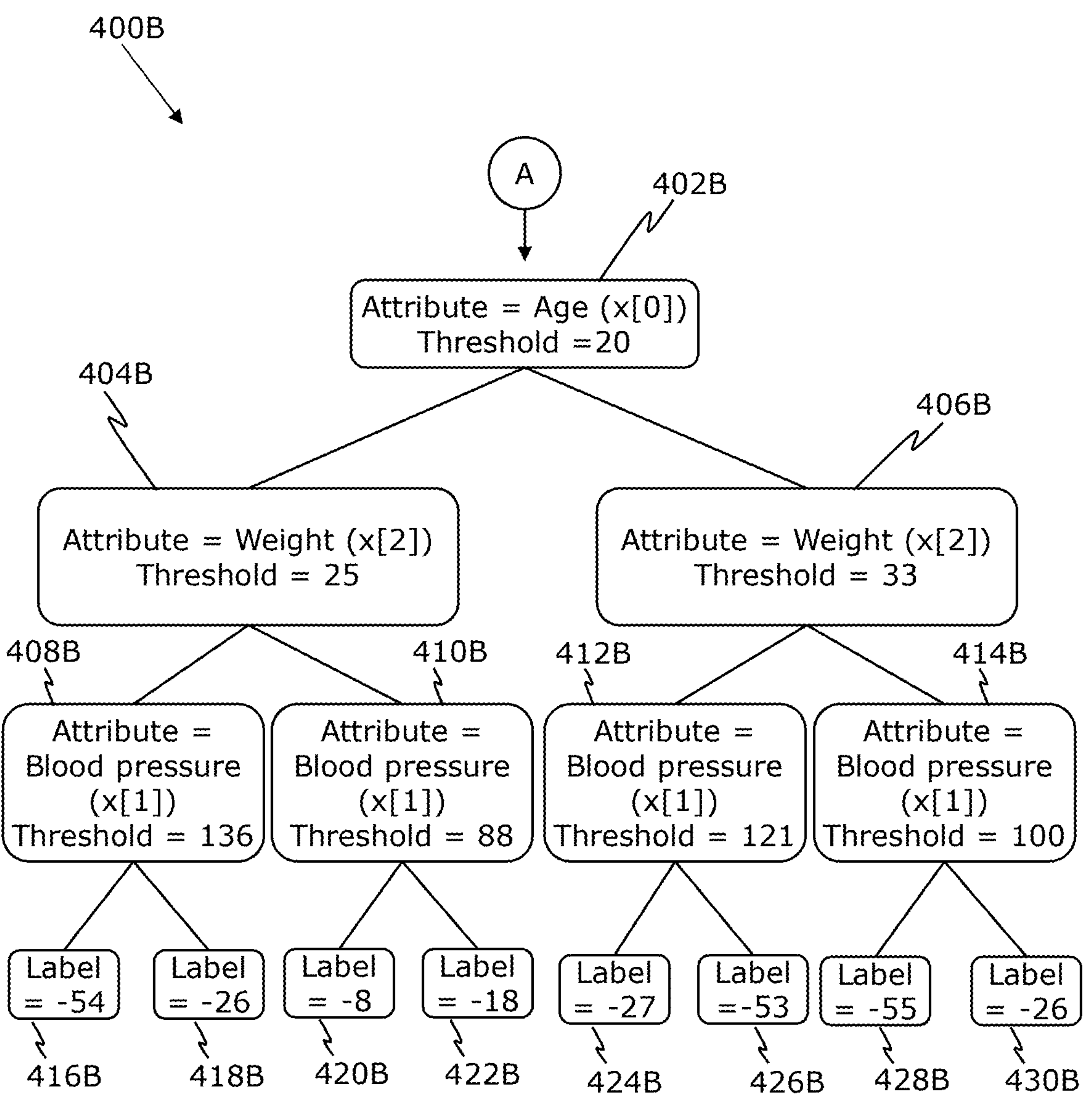

FIGS. 4A-4C illustrate an exemplary permuted decision tree classification model and its shares, in accordance with an embodiment of the present disclosure. FIGS. 4A, 4B, and 4C are described in conjunction with elements from FIG. 1, FIG. 2, and FIG. 3. With reference to FIG. 4A, there is shown an exemplary permuted decision tree classification model, i.e., a permuted decision tree 400. The attribute sequence vector is $[a_0, a_2, a_1]$, where $a_0$ is "Age", $a_2$ is "Weight", and $a_1$ is "Blood Pressure". The permuted decision tree 400 is obtained from an original decision tree (not shown) based on the attribute sequence vector (check FIG. 3 for detailed explanation). The root node 402 of the permuted decision tree 400 may be associated with "Age", a first attribute. First nodes that signify children of the root node may be associated with "Weight", a third attribute. Second nodes that signify children of the first nodes may be associated with "Blood Pressure", a second attribute.

For example, an original query data "x" constituting a sequence of attribute values "[x(0), x(1), x(2)]" may be [60, 138, 90]. Here "x(0)" is an attribute value of the first attribute, "x(1)" is an attribute value of the second attribute, and "x(2)" is an attribute value of the third attribute. This signifies that age is 60, blood pressure is 138, and weight is 90. A permuted query data "x'" obtained after altering the sequence of attribute values based on the attribute sequence vector is "[x(0), x(2), x(1)]". Thus, the permuted query data "x" is [60, 90, 138].

The first device 102 generates two shares of the permuted query data "x'". A first share of the permuted query data "$[x']_0$" is stored in the first device 102. Here, $[x']_0=[\{x_{(Age)}\}_0, \{x_{(Weight)}\}, \{x_{(Blood\ Pressure)}\}_0]^T$. Furthermore, the first device 102 transmits a first seed "$s_q$" to the second device 104 to enable the second device 104 to generate a second share of the permuted query data "$[x']_1$" using the first seed. Here, $[x']_1=[\{x_{(Age)}\}_1, \{x_{(Weight)}\}_1, \{x_{(Blood\ Pressure)}\}_1]$ T. The third device 106 transmits a first share of a permutation matrix "$[A]_0$" to the first device 102 and a second share of the permutation matrix "$[A]_1$" to the second device 104. Thereafter, the first device 102 generates a first share of a fully permuted query data $[x'^{(A)}]$, based on "$[x']_0$", "$[A]_0$", a masked version of "$[x']_1$", and a masked version "$[A]_1$". The first share of a fully permuted query data $$[x'^{(A)}]_0 = [\{x'^{(A)}_{Age}\}_0, \{x'^{(A)}_{Weight}\}_0, \{x'^{(A)}_{Blood\ Pressure}\}_0].$$

The second device 104 generates a second share of the fully permuted query data $[x'^{(A)}]_1$ based on "$[x']_1$", "$[A]_1$", a masked version of "$[x']_0$", and a masked version "$[A]_0$". The second share of a fully permuted query data $$[x'^{(A)}]_1 = [\{x'^{(A)}_{Age}\}_1, \{x'^{(A)}_{Weight}\}_1, \{x'^{(A)}_{Blood\ Pressure}\}_1].$$

The third device 106 may split the permuted decision tree 400 into a first share of the permuted decision tree 400A (see FIG. 4B) and a second share of the permuted decision tree 400B (see FIG. 4C). The splitting is such that a threshold associated with each non-leaf node of the permuted decision tree 400 is split into a first share of threshold and a second share of threshold based on additive secret sharing. Thus, an accumulation of the first share of threshold and the second share of the threshold is equal to the threshold. For example, a threshold "50" that is associated with a root node 402 of the permuted decision tree 400 is split into a first share of threshold "30" and a second share of threshold "20". The first share of threshold "30" is associated with a root node 402A of the first share of the permuted decision tree 400A whereas the second share of threshold "20" is associated with a corresponding root node 402B of the second share of the permuted decision tree 400B.

Furthermore, each label associated with each leaf node of the permuted decision tree 400 is split into a first label share and a second label share based on additive secret sharing. Thus, an accumulation of a first label share and a second label share is equal to a label associated with a leaf node of the permuted decision tree 400. For example, a label "0" that is associated with a leaf node 416 of the permuted decision tree 400 is split into a first label share "54" and a second label share "−54". The first label share "54" is associated with a leaf node 416A of the first share of the permuted decision tree 400A whereas the second label share "−54" is associated with a corresponding leaf node 416B of the second share of the permuted decision tree 400B.

The first device 102 uses the second seed "s" received from the third device 106 to compute a first share of the threshold associated with the root node 402A of the first share of the permuted decision tree 400A. The computation is carried out by applying a PRNG on the second seed. The outcome of the PRNG application is the first share of the threshold associated with the root node 402A (i.e., 30). It may be noted that the first device 102 is required to compute the first share of the threshold associated with the root node 402A as the third device 106 does not transmit the first share of the permuted decision tree 400A to the first device 102. On the other hand, the third device 106 transmits the second share of the permuted decision tree 400B to the second device 104. Therefore, a second share of the threshold (i.e., 20) associated with the corresponding root node 402B of the second share of the permuted decision tree 400B is stored in the second device 104.

Once the first share of the threshold associated with the root node 402A and the second share of the threshold associated with the corresponding root node 402B are available, the second device 104 may perform a secure comparison operation. In an embodiment, the first device 102 receives, from the second device 102, an attribute "a*" associated with the root node 402A of the first share of the permuted decision tree 400B. The attribute is stored in the corresponding root node 402B of the second share of the permuted decision tree 400B. As shown in FIG. 4C, the attribute "a*" is "Age". The attribute associated with the root node 402A is identical to the attribute stored in the corresponding root node 402B. Once the attribute is received, the first device 402 determines an element in the first share of the fully permuted query data "$[x'^{(A)}]_0$" that is associated with the attribute, i.e., "Age". Each element in "$[x'^{(A)}]_0$" is associated with an attribute which could be one amongst "Age", "Weight", or "Blood Pressure". The element associated with "Age", i.e., $$\text{“}[x'^{(A)}_{Age}]_0\text{”}$$

is determined. The second device 104 determines a corresponding element $$\text{“}[x'^{(A)}_{Age}]_1\text{”}$$

in the second share of the fully permuted query data "$[x'^{(A)}]_1$" that is associated with the attribute "Age". The element $$\text{“}[x'^{(A)}_{Age}]_0\text{”}$$

in the first share of the fully permuted query data "$[x'^{(A)}]_0$" and the corresponding element $$\text{“}[x'^{(A)}_{Age}]_1\text{”}$$

in the second snare of the fully permuted query data "$[x'^{(A)}]_1$" are shares of a first element of the fully permuted query data "$[x'^{(A)}]$".

For the secure comparison operation, the first device 102 may transmit, to the second device 104, a masked version of the first share of the threshold (for example, "$30+[\alpha]_0$") associated with the root node 402A and a masked version of the element in the first share of the fully permuted query data "$[x'^{(A)}]_0$" associated with the attribute "Age" (for example, $$\text{“}[x'^{(A)}_{Age}]_0 + [a_0]\text{”}).$$

The masked version of the first share of the threshold ("$30+[\alpha]_0$") associated with the root node 402A and the masked version of the element $$(\text{“}[x'^{(A)}_{Age}]_0 + [a_0]\text{”})$$

in the first share of the fully permuted query data "$[x'^{(A)}]_0$" are obtained based on a first share "$[\alpha]_0$" of a mask variable "α".

The second device 104 may perform the secure comparison operation based on a masked version of the second share of the threshold (for example, "$20+[\alpha]_1$") associated with the corresponding root node 402B, a masked version of the corresponding element in the second share of the fully permuted query data "$[x'^{(A)}]_1$" associated with the attribute "Age" (for example, $$\text{“}[x'^{(A)}_{Age}]_1 + [a_1]\text{”}).$$

the masked version of the first share of the threshold ("$30+[\alpha]_0$") associated with the root node 402A, and the masked version of the element in the first share of the fully permuted query "$[x'^{(A)}]_0$" data associated with the attribute "Age"

$$(\text{“}[x'^{(A)}_{Age}]_0 + [a_0]\text{”}).$$

The masked version of the second share of the threshold "$20+[\alpha]_1$" associated with the corresponding root node 402B and the masked version of the corresponding element $$(\text{“}[x'^{(A)}_{Age}]_1 + [a_1]\text{”}).$$

in the second share of the fully permuted query data "$[x'^{(A)}]_1$" are obtained based on a second share "$[\alpha]_1$" of the mask variable "α".

After performing the secure comparison operation, the second device 104 determines a corresponding first non-leaf node (for example 406B), which is the child of the corresponding root node 402B, based on an outcome of the secure comparison operation. The second device 104 transmits the outcome of the secure comparison operation to the first device 102. Upon reception, the first device 102 determines a first non-leaf node (for example 406A), which is the child of the root node 402A, based on the outcome of the secure comparison operation. This is because of a placement of the first non-leaf node 406A in the first share of the permuted decision tree 400A and a placement of the corresponding first non-leaf node 406B in the second share of the permuted decision tree 400B. Furthermore, the first device 102 determines a portion of the first share of the threshold associated with the root node 402A based on the outcome of the secure comparison operation. The first share of the threshold associated with the root node 402A is "30", which is "011110" in binary. Based on the secure comparison operation, i.e., determination of the first non-leaf node 406A, the determined portion of the first share of the threshold associated with the root node 402A is "110".

After determining the first non-leaf node 406A, the first device 102 computes a first share of a threshold associated with the first non-leaf node 406A, which is a child of the root node 402A, by applying a PRNG on the (determined) portion (i.e., "110") of the first share of the threshold (i.e., "011110") associated with the root node 402A. The outcome of the PRNG application is "42", i.e., "101010" in binary. Thus, the first share of a threshold associated with the first non-leaf node 406A is "42". A second share of the threshold (i.e., "33") associated with the corresponding first non-leaf node 406B of the second share of the permuted decision tree 400B is stored in the second device 104.

Similarly, the first device 102 computes a first share of a threshold associated with a second non-leaf node (for example, 414A), which is a parent of a pair of leaf nodes (for example, 428A and 430A) of the first share of the permuted decision tree 400A, by applying a PRNG on a portion (for example, "010") of a first share of a threshold (for example, "42") associated with a parent node (i.e., the first non-leaf node 406A) of the second non-leaf node 414A. The outcome of the PRNG application is the first share of the threshold associated with the second non-leaf node 414A (i.e., 25). It is to be noted that the first non-leaf node 406A and the second non-leaf node 414A are included in the set of non-leaf nodes. The non-leaf nodes in the set of non-leaf nodes are those that have been determined as outcomes of secure comparison operations. As described earlier, the first non-leaf node 406A was determined as the outcome of the secure comparison operation. Similarly, the first share of the threshold associated with the second non-leaf node 414A is computed based on determination of the second non-leaf node 414A as an outcome of a secure comparison operation. A second share of the threshold (i.e., 100) associated with a corresponding second non-leaf node (for example, 414B), which is a parent of a corresponding pair of leaf nodes (for example, 428B and 430B), of the second share of the permuted decision tree 400B is stored in the second device 104.

Once the first share of the threshold associated with the second non-leaf node 414A and the second share of the threshold associated with the corresponding second non-leaf node 414B are available, the second device 104 may perform a final secure comparison operation. In an embodiment, the first device 102 receives, from the second device 102, an attribute "a*" associated with the second non-leaf node 414A of the first share of the permuted decision tree 400B. The attribute is stored in the corresponding second non-leaf node 414B of the second share of the permuted decision tree 400B. As shown in FIG. 4C, the attribute "a*" is "Blood Pressure". The attribute associated with the second non-leaf node 414A is identical to the attribute stored in the corresponding second non-leaf node 414B. Once the attribute is received, the first device 402 determines an element in the first share of the fully permuted query data "$[x'^{(A)}]_0$" that is associated with the attribute, i.e., "Blood Pressure". Thus, the element associated with "Blood Pressure", i.e., $$“[x'^{(A)}_{Blood\ Pressure}]_0”,$$

is determined. The second device 104 determines a corresponding element $$“[x'^{(A)}_{Blood\ Pressure}]_1”,$$

in the second share of the fully permuted query data "$[x'^{(A)}]_0$" that is associated with the attribute "Blood Pressure". The element $$“[x'^{(A)}_{Blood\ Pressure}]_0”,$$

in the first share of the fully permuted query data "$[x'^{(A)}]_0$" and the corresponding element $$“[x'^{(A)}_{Blood\ Pressure}]_1”,$$

in the second share of the fully permuted query data "$[x'^{(A)}]_1$" are shares of an element of the fully permuted query data "$[x'^{(A)}]$".

For the final secure comparison operation, the first device 102 may transmit, to the second device 104, a masked version of the first share of the threshold (for example, "25+$[\alpha]_0$") associated with the second non-leaf node 414A and a masked version of the element in the first share of the fully permuted query data "$[x'^{(A)}]$," associated with the attribute "Blood Pressure" (for example, $$“[x'^{(A)}_{Blood\ Pressure}]_0 + [a_0]”).$$

The masked version of the first share of the threshold ("25+$[\alpha]_0$") associated with the second non-leaf node 414A and the masked version of the element $$(“[x'^{(A)}_{Blood\ Pressure}]_0 + [a_0]”)$$

in the first share of the fully permuted query data "$[x'^{(A)}]$," are obtained based on the first share "$[\alpha]_0$" of the mask variable "$\alpha$".

The second device 104 may perform the secure comparison operation based on a masked version of the second share of the threshold (for example, "100+$[\alpha]_1$") associated with the corresponding second non-leaf node 414B, a masked version of the corresponding element in the second share of the fully permuted query data "$[x'^{(A)}]_1$" associated with the attribute "Blood Pressure" (for example, $$\text{``}[x'^{(A)}_{Blood\ Pressure}]_1 + [a_1]\text{''}),$$

the masked version of the first share of the threshold ("25+$[\alpha]_0$") associated with the second non-leaf node 414A, and the masked version of the element in the first share of the fully permuted query data "$[x'^{(A)}]_0$" associated with the attribute "Blood Pressure"

$$(\text{``}[x'^{(A)}_{Blood\ Pressure}]_0 + [a_0]\text{''}).$$

The masked version of the second share of the threshold "20+$[\alpha]_1$" associated with the corresponding root node 402B and the masked version of the corresponding element in the second share of the fully permuted query data "$[x'^{(A)}]_1$" are obtained based on a second share "$[\alpha]_1$" of the mask variable "$\alpha$".

After performing the secure comparison operation, the second device 104 determines a corresponding leaf node (for example 430B), which is the child of the corresponding second non-leaf node 414B, based on an outcome of the secure comparison operation. Thereafter, the second device 104 generates a second share of the classification result based on a label (for example, "−26") associated with the corresponding leaf node stored 430B. The label is stored in the corresponding leaf node. The second device 104 transmits the outcome of the secure comparison operation and the second share of the classification result to the first device 102. Upon reception, the first device 102 determines a leaf node (for example 430A), which is the child of the second non-leaf node 414A, based on the outcome of the secure comparison operation. This is because of a placement of the leaf node 430A in the first share of the permuted decision tree 400A and a placement of the corresponding leaf node 430B in the second share of the permuted decision tree 400B.

Furthermore, the first device 102 determines a first share of the classification result by applying the PRNG on a portion of the first share of the threshold associated with the second non-leaf node 414A, wherein a result of the application of the PRNG is a label associated with the leaf node 430A. The first share of the threshold associated with the second non-leaf node 414A is "25", which is "011001" in binary. Based on the secure comparison operation, i.e., determination of the leaf node 430A, the determined portion of the first share of the threshold associated with the second non-leaf node 414A is "001". The first device 102 computes the label by applying the PRNG on the (determined) portion (i.e., "001") of the first share of the threshold (i.e., "011001") associated with the second non-leaf node 414A. The outcome of the PRNG application is "27. The first device 104 generates the first share of the classification result based on the label (i.e., "27") associated with the leaf node stored 430A. Thereafter, the first device generates a decision tree classification result based on the first share of the classification result and the second share of the classification result.

Figure 5A:
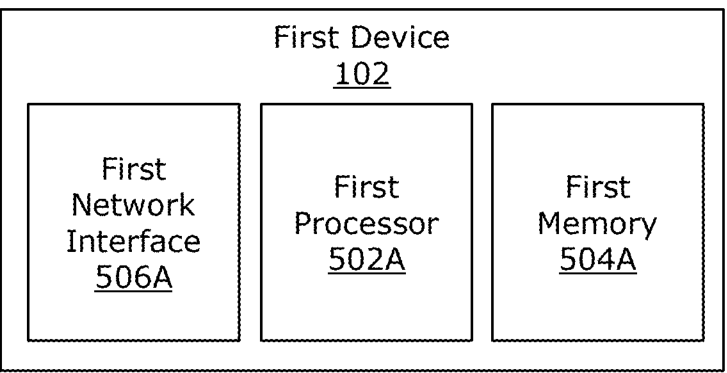
FIG. 5A-5C are block diagrams illustrating components of the entities in the exemplary networking environment, in accordance with an embodiment of the present disclosure.
Figure 5B:
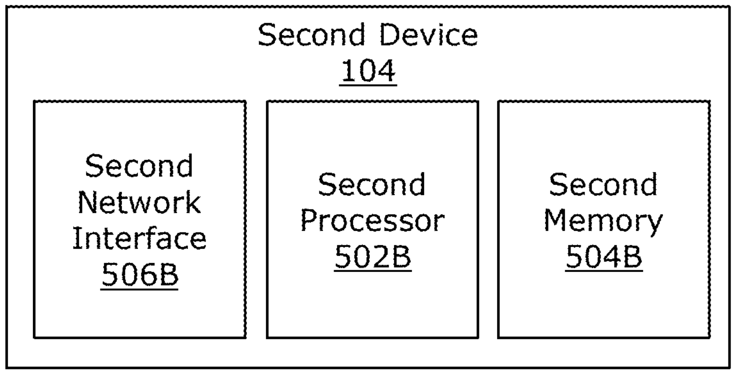
Figure 5C:
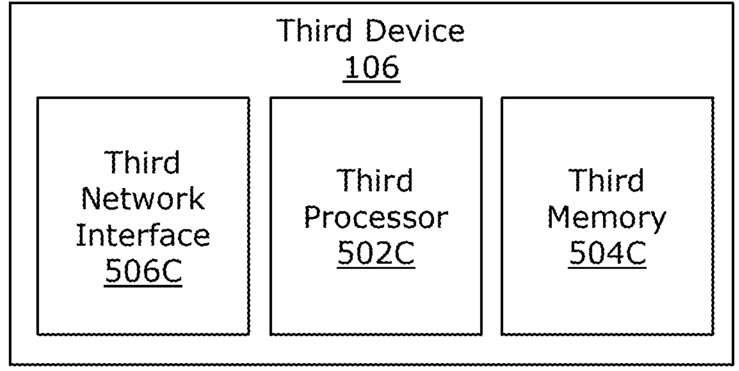

FIGS. 5A-5C are block diagrams illustrating components of the entities in the exemplary networking environment 100, in accordance with an embodiment of the present disclosure. FIGS. 5A-5C are described in conjunction with elements from FIG. 1, FIG. 2, FIG. 3, and FIGS. 4A-4C. With reference to FIG. 5A, there is shown the first device 102. The first device 102 includes a first processor 502A, a first memory 504A, and a first network interface 506A. The first memory 504A stores the original query data, the attribute sequence vector (received from the third device 106), the permuted query data, shares of the permuted query data, the first seed, the first share of the permutation matrix (received from the third device 106), the first share of a fully permuted query data, the masked version of the first share of the permuted query data, the masked version of the first share of the permutation matrix, the masked version of the second share of the permuted query data (received from the second device 104), the masked version of the second share of the permutation matrix (received from the second device 104), the second seed (received from the third device 106), the first shares of thresholds associated with the set of non-leaf nodes of a first share of the permuted decision tree, outcomes of the secure comparison operations (received from the second device 104), the first share of the classification result, the second share of the classification result (received from the second device 104), and the decision tree classification result.

In an embodiment, the first processor 502A is configured to perform a set of operations that enable generation of the first share of the classification result, the second share of a classification result, and the decision tree classification result.

The first processor 502A refers to a computational element that is operable to respond to and processes instructions that drive the first device 102. The first processor 502A may refer to one or more individual processors, processing devices, and various elements associated with a processing device that may be shared by other processing devices. Additionally, the one or more individual processors, the processing devices, and the various elements are arranged in various architectures for responding to and processing the instructions that drive the first device 102. In some implementations, the first processor 502A may be an independent unit.

Examples of the first processor 502A may include, but are not limited to, a hardware processor, a digital signal processor (DSP), a microprocessor, a microcontroller, a complex instruction set computing (CISC) processor, an application-specific integrated circuit (ASIC) processor, a reduced instruction set (RISC) processor, a very long instruction word (VLIW) processor, a state machine, a data processing unit, a graphics processing unit (GPU), and control circuitry.

The first memory 504A refers to a volatile or persistent medium, such as an electrical circuit, a magnetic disk, a virtual memory, or an optical disk, in which a computer stores data or software for any duration. Optionally, the first memory 504A is a non-volatile mass storage, such as a physical storage media. Examples of implementation of the first memory 504A may include, but are not limited to, an Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

The first network interface 506A refers to a communication interface to enable the first device 102 to communicate with the second device 104 and the third device 106.

Examples of the first network interface 506A include, but are not limited to, a network interface card, a transceiver, and the like.

With reference to FIG. 5B, there is shown the second device 104. The second device 104 includes a second processor 502B, a second memory 504B, and a second network interface 506B. The second memory 504B stores the first seed (received from the first device 102), the second share of the permuted query data, the second share of the permutation matrix (received from the third device 106), the masked version of the first share of the permuted query data (received from the first device 102), the masked version of the first share of the permutation matrix (received from the first device 102), the second share of a fully permuted query data, the masked version of the second share of the permuted query data, the masked version of the second share of the permutation matrix, the second shares of the thresholds associated with the set of corresponding non-leaf nodes of the second share of the permuted decision tree (received from the third device 106), attributes associated with non-leaf nodes of the second share of the permuted decision tree (received from the third device 106), labels associated with leaf nodes of the second share of the permuted decision tree (received from the third device 106), masked versions of the first shares of the thresholds associated with the set of non-leaf nodes (received from the first device 102), a masked version of the first share of the fully permuted query data (received from the first device 102), outcomes of the secure comparison operations, and the second share of the classification result.

In an embodiment, the second processor 502B is configured to perform a set of operations that enable the generation of the first share of the classification result, the second share of a classification result, and the decision tree classification result.

The second processor 502B refers to a computational element that is operable to respond to and processes instructions that drive the second device 104. The second processor 502B may refer to one or more individual processors, processing devices, and various elements associated with a processing device that may be shared by other processing devices. Additionally, the one or more individual processors, the processing devices, and the various elements are arranged in various architectures for responding to and processing the instructions that drive the second device 104. In some implementations, the second processor 502B may be an independent unit.

Examples of the second processor 502B may include, but are not limited to, a hardware processor, a digital signal processor (DSP), a microprocessor, a microcontroller, a complex instruction set computing (CISC) processor, a state machine, an application-specific integrated circuit (ASIC) processor, a very long instruction word (VLIW) processor, a reduced instruction set (RISC) processor, a data processing unit, a graphics processing unit (GPU), and other processors or control circuitry.

The second memory 504B refers to a volatile or persistent medium, such as an electrical circuit, a magnetic disk, a virtual memory, or an optical disk, in which a computer can store data or software for any duration. Optionally, the second memory 504B is a non-volatile mass storage, such as a physical storage media. Examples of implementation of the second memory 504B include, but are not limited to, an Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

The second network interface 506B refers to a communication interface to enable the second device 104 to communicate with the first device 102 and the third device 106. Examples of the second network interface 506B include, but are not limited to, a network interface card, a transceiver, and the like.

With reference to FIG. 5C, there is shown the third device 106. The third device 106 includes a third processor 502C, a third memory 504C, and a third network interface 506C. The third memory 504C stores the attribute sequence vector, the first share of the permutation matrix, the second share of the permutation matrix, the original decision tree, the permuted decision tree, the first share of the permuted decision tree, the second share of the permuted decision tree, the second seed, the second shares of the thresholds associated with the set of corresponding non-leaf nodes of the second share of the permuted decision tree, the attributes associated with the non-leaf nodes of the second share of the permuted decision tree, and labels associated with the leaf nodes of the second share of the permuted decision tree.

In an embodiment, the third processor 502C is configured to perform a set of operations that enable the generation of the first share of the classification result, the second share of a classification result, and the decision tree classification result.

The third processor 502C refers to a computational element that is operable to respond to and processes instructions that drive the third device 106. The third processor 502C may refer to one or more individual processors, processing devices, and various elements associated with a processing device that may be shared by other processing devices. Additionally, the one or more individual processors, the processing devices, and the various elements are arranged in various architectures for responding to and processing the instructions that drive the third device 106. In some implementations, the third processor 502C may be an independent unit.

Examples of the third processor 502C may include, but are not limited to, a hardware processor, a digital signal processor (DSP), a microprocessor, a microcontroller, a complex instruction set computing (CISC) processor, a state machine, an application-specific integrated circuit (ASIC) processor, a very long instruction word (VLIW) processor, a reduced instruction set (RISC) processor, a data processing unit, a graphics processing unit (GPU), and other processors or control circuitry.

The third memory 504C refers to a volatile or persistent medium, such as an electrical circuit, a magnetic disk, a virtual memory, or an optical disk, in which a computer can store data or software for any duration. Optionally, the third memory 504C is a non-volatile mass storage, such as a physical storage media. Examples of implementation of the third memory 504C include, but are not limited to, an Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

The third network interface 506C refers to a communication interface to enable the third device 106 to communicate with the first device 102 and the second device 104.

Examples of the third network interface 506C include, but are not limited to, a network interface card, a transceiver, and the like.

Modifications to embodiments of the present disclosure described in the foregoing are possible without departing from the scope of the present disclosure as defined by the accompanying claims. Expressions such as "including", "comprising", "incorporating", "have", "is" used to describe, and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A first device comprising a first processor, wherein the first processor is configured to:

obtain a permuted query data from an original query data comprising a sequence of attribute values, wherein the sequence of attribute values is altered based on a permutation matrix to obtain the permuted query data;

generate two shares of the permuted query data, wherein a first share of the permuted query data is stored in the first device, wherein the two shares are generated by applying additive secret sharing on the permuted query data to split the permuted query data into two parts, wherein the split leads to generation of the first share of the permuted query data and the second share of the permuted query data;

transmit a first seed to a second device to enable the second device to generate a second share of the permuted query data using the first seed;

receive a first share of the permutation matrix from a third device, wherein the second device receives a second share of the permutation matrix from the third device;

generate a first share of a fully permuted query data based on the first share of the permuted query data, the first share of the permutation matrix, a masked version of the second share of the permuted query data and a masked version of the second share of the permutation matrix;

transmit, to the second device, a masked version of the first share of the permuted query data and a masked version of the first share of the permutation matrix to enable the second device to generate a second share of the fully permuted query data, wherein the generation is further based on the second share of the permuted query data and the second share of the permutation matrix;

receive a second seed from the third device, wherein the second seed is used to compute first shares of thresholds associated with a set of non-leaf nodes of a first share of a permuted decision tree, and wherein second shares of the thresholds associated with a set of corresponding non-leaf nodes of a second share of the permuted decision tree are received by the second device from the third device;

receive a second share of a classification result from the second device, wherein the second share of the classification result is generated based on outcomes of secure comparison operations, and wherein the second device performs the secure comparison operations based on masked versions of each of second shares of the thresholds associated with the set of corresponding non-leaf nodes, the second share of the fully permuted query data, the first shares of the thresholds associated with the set of non-leaf nodes, and the first share of the fully permuted query data;

receive, from the second device, outcomes of the secure comparison operations;

generate a first share of the classification result based on the outcomes of the secure comparison operations; and generate a decision tree classification result based on the first share of the classification result and the second share of the classification result.

2. The first device according to claim 1, wherein the first processor is further configured to:

receive an attribute sequence vector from the third device, wherein the attribute sequence vector is a permuted sequence of attributes, wherein the attribute sequence vector is an outcome of a product of the permutation matrix and a matrix including a sequence of attributes; and alter the sequence of attribute values constituting the original query data based on the permuted sequence of attributes, wherein the permuted query data is obtained based on the alteration.

3. The first device according to claim 1, wherein the first processor is further configured to generate the first seed such that an application of a pseudo-random generator (PRNG) on the first seed by the second device leads to a generation of a first element of the second share of the permuted query data, wherein an application of the PRNG on the first element leads to a generation of a second element of the second share of the permuted query data, and wherein an application of the PRNG on a second-last element of the permuted query data leads to a generation of a last element of the second share of the permuted query data.

4. The first device according to claim 1, wherein the first share of the permutation matrix and the second share of the permutation matrix is obtained, by the third device, based on an application of an additive secret sharing on the permutation matrix, wherein the application leads to splitting of the permutation matrix into the first share of the permutation matrix and the second share of the permutation matrix, wherein each of the permutation matrix, the first share of the permutation matrix, and the second share of the permutation matrix is a square matrix, wherein a number of rows and a number of columns in each of the permutation matrix, the first share of the permutation matrix, and the second share of the permutation matrix is equal to a number of elements in the permuted query data, wherein each of the permuted query data, the first share of the permuted query data, and the second share of the permuted query data is a matrix that includes one column and a number of rows equal to the number of elements in the permuted query data, wherein a number of elements included in each of the first share of the permuted query data, and the second share of the permuted query is equal to the number of elements in the permuted query data, wherein a number of elements included in each of the first share of the fully permuted query data and the second share of the fully permuted query data is equal to the number of elements in the permuted query data.

5. The first device according to claim 4, wherein the first processor is further configured to:

receive, from the second device, the masked version of the second share of the permuted query data and the masked version of the second share of the permutation matrix; and compute a first share of a product of the permutation matrix and the permuted query data for the generation of the first share of the fully permuted query data, wherein the computation is based on a matrix-vector secure multiplication protocol, wherein the fully permuted query data is a product of the permutation matrix and the permuted query data.

6. The first device according to claim 5, wherein the computation of an element in the first share of the fully permuted query data is performed based on all elements of the first share of the permuted query data, a set of elements of the first share of the permutation matrix, a first share of a first beaver triple, a first share of a second beaver triple, a first share of a third beaver triple, all elements of the second share of the permuted query data where each element is masked by a second share of the second beaver triple, and a set of elements of the second share of the permutation matrix masked by a second share of the first beaver triple.

7. The first device according to claim 6, wherein the first processor is further configured to:

mask each element included in the first share of the permuted query data by the first share of the second beaver triple to generate the masked version of the first share of the permuted query data; and mask each element of the first share of the permutation matrix by the first share of the first beaver triple to generate the masked version of the first share of the permutation matrix, wherein the second device computes a second share of a product of the permutation matrix and the permuted query data for the generation of the second share of the fully permuted query data, and wherein the computation of an element in the second share of the fully permuted query data is performed based on all elements of the second share of the permuted query data, the set of elements of the second share of the permutation matrix, the second share of the first beaver triple, the second share of the second beaver triple, a second share of the third beaver triple, all elements included in the first share of the permuted query data masked by the first share of the second beaver triple, and the set of elements of the first share of the permutation matrix masked by the first share of the first beaver triple.

8. The first device according to claim 1, wherein the first processor is further configured to:

compute a first share of a threshold associated with a root node of the first share of the permuted decision tree by applying a PRNG on the second seed, wherein a second share of the threshold associated with a corresponding root node of the second share of the permuted decision tree is stored in the second device;

compute a first share of a threshold associated with a first non-leaf node, which is a child of the root node, by applying a PRNG on a portion of the first share of the threshold associated with the root node, wherein a second share of the threshold associated with a corresponding first non-leaf node of the second share of the permuted decision tree is stored in the second device; and compute a first share of a threshold associated with a second non-leaf node, which is a parent of a pair of leaf nodes of the first share of the permuted decision tree, by applying a PRNG on a portion of a first share of a threshold associated with a parent of the second non-leaf node, wherein the first non-leaf node and the second non-leaf node are included in the set of non-leaf nodes, wherein a second share of the threshold associated with a corresponding second non-leaf node, which is a parent of a corresponding pair of leaf nodes, of the second share of the permuted decision tree is stored in the second device.

9. The first device according to claim 8, wherein the first processor is further configured to:

receive, from the second device, an attribute associated with the root node of the first share of the permuted decision tree, wherein the attribute is stored in the corresponding root node of the second share of the permuted decision tree; and determine an element in the first share of the fully permuted query data that is associated with the attribute, wherein the second device determines a corresponding element in the second share of the fully permuted query data that is associated with the attribute, and wherein the element in the first share of the fully permuted query data and the corresponding element in the second share of the fully permuted query data are shares of an element of the fully permuted query data.

10. The first device according to claim 9, wherein the first processor is further configured to:

transmit, to the second device, a masked version of the first share of the threshold associated with the root node and a masked version of the element in the first share of the fully permuted query data associated with the attribute, wherein the masked version of the first share of the threshold associated with the root node and the masked version of the element in the first share of the fully permuted query data are obtained based on a first share of a mask variable, wherein the second device performs the secure comparison operation based on a masked version of the second share of the threshold associated with the corresponding root node, a masked version of the corresponding element in the second share of the fully permuted query data associated with the attribute, the masked version of the first share of the threshold associated with the root node, and the masked version of the element in the first share of the fully permuted query data associated with the attribute, wherein the masked version of the second share of the threshold associated with the corresponding root node and the masked version of the corresponding element in the second share of the fully permuted query data are obtained based on a second share of the mask variable, and wherein the second device determines the corresponding first non-leaf node, which is the child of the corresponding root node, based on an outcome of the secure comparison operation;

receive the outcome of the secure comparison operation from the second device; and determine the first non-leaf node, which is the child of the root node, and the portion of the first share of the threshold associated with the root node based on the outcome of the secure comparison operation.

11. The first device according to claim 8, wherein the first processor is further configured to:

receive, from the second device, an attribute associated with the second non-leaf node of the first share of the permuted decision tree, wherein the attribute is stored in the corresponding second non-leaf node of the second share of the permuted decision tree; and determine an element in the first share of the fully permuted query data that is associated with the attribute, wherein the second device determines a corresponding element in the second share of the fully permuted query data that is associated with the attribute, and wherein the element in the first share of the fully permuted query data and the corresponding element in the second share of the fully permuted query data are shares of an element of the fully permuted query data.

12. The first device according to claim 11, wherein the first processor is further configured to:

transmit, to the second device, a masked version of the first share of the threshold associated with the second non-leaf node and a masked version of the element in the first share of the fully permuted query data associated with the attribute, wherein the masked version of the first share of the threshold associated with the second non-leaf node and the masked version of the element in the first share of the fully permuted query data are obtained based on a first share of a mask variable, wherein the second device performs the secure comparison operation based on a masked version of the second share of the threshold associated with the corresponding second non-leaf node, a masked version of the corresponding element in the second share of the fully permuted query data associated with the attribute, the masked version of the first share of the threshold associated with the second non-leaf node, and the masked version of the element in the first share of the fully permuted query data associated with the attribute, wherein the masked version of the second share of the threshold associated with the corresponding second non-leaf node and the masked version of the corresponding element in the second share of the fully permuted query data is obtained based on a second share of the mask variable, wherein the second device determines a corresponding leaf node, which is the child of the corresponding second non-leaf node, based on an outcome of the secure comparison operation, and wherein the second device generates the second share of the classification result based on a label associated with the corresponding leaf node stored in the corresponding leaf node;

receive the outcome of the secure comparison operation and the second share of the classification result and from the second device;

determine a leaf node, which is a child of the second non-leaf node, and a portion of the first share of the threshold associated with the second non-leaf node based on the outcome of the secure comparison operation; and determine the first share of the classification result by applying the PRNG on the portion of the first share of the threshold associated with the second non-leaf node, wherein a result of the application of the PRNG is a label associated with the leaf node.

13. A second device comprising a second processor, the second processor configured to:

receive a first seed from a first device;

generate a second share of the permuted query data using the first seed, wherein the first device generates, based on application of additive secret sharing on a permuted query data, a first share of the permuted query data and the second share of the permuted query data, wherein the first device applies additive secret sharing on the permuted query data to split the permuted query data into two parts, wherein the split leads to generation of the first share of the permuted query data and the second share of the permuted query data, wherein the first device obtains the permuted query data from an original query data comprising a sequence of attribute values, and wherein the sequence of attribute values is altered based on a permutation matrix to generate the permuted query data;

receive a second share of the permutation matrix from a third device, wherein the first device receives a first share of the permutation matrix from the third device;

receive, from the first device, a masked version of the first share of the permuted query data and a masked version of the first share of the permutation matrix;

generate a second share of a fully permuted query data based on the second share of the permuted query data, the second share of the permutation matrix, the masked version of the first share of the permuted query data and the masked version of the first share of the permutation matrix;

transmit, to the first device, a masked version of the second share of the permuted query data and a masked version of the second share of the permutation matrix to enable the first device to generate a first share of the fully permuted query data, wherein the generation is further based on the first share of the permuted query data and the first share of the permutation matrix;

receive second shares of the thresholds associated with a set of corresponding non-leaf nodes of a second share of the permuted decision tree from the third device, wherein the first device receives a second seed from the third device, and wherein the first device uses the second seed to compute first shares of thresholds associated with a set of non-leaf nodes of a first share of a permuted decision tree;

receive masked versions of the first shares of the thresholds associated with the set of non-leaf nodes and a masked version of the first share of the fully permuted query data;

generate a second share of a classification result based on outcomes of secure comparison operations, wherein the secure comparison operations are performed based on masked versions of each of the second shares of the thresholds associated with the set of non-leaf nodes, the second share of the fully permuted query data, the first shares of the thresholds associated with the set of non-leaf nodes, and the first share of the fully permuted query data; and transmit the second share of the classification result and the outcomes of the secure comparison operations to the first device, wherein the first device generates a first share of the classification result based on the outcomes of the secure comparison operations, and wherein the first device generates a decision tree classification result based on the first share of the classification result and the second share of the classification result.

14. A method comprising:

obtaining, by a first device, a permuted query data from an original query data, wherein the original query data comprises a sequence of attribute values, wherein the sequence of attribute values is altered based on a permutation matrix to obtain the permuted query data;

generating, by the first device, two shares of the permuted query data, wherein a first share of the permuted query data is stored in the first device, wherein the first device applies additive secret sharing on the permuted query data to split the permuted query data into two parts, wherein the split leads to generation of the first share of the permuted query data and the second share of the permuted query data;

transmitting, by the first device, a first seed to a second device, wherein the first seed enables the second device to generate a second share of the permuted query data using the first seed;

receiving, by the first device, a first share of the permutation matrix from a third device, wherein the second device receives a second share of the permutation matrix from the third device;

generating, by the first device, a first share of a fully permuted query data, wherein the generation is based on the first share of the permuted query data, the first share of the permutation matrix, a masked version of the second share of the permuted query data, and a masked version of the second share of the permutation matrix;

transmitting, by the first device to the second device, a masked version of the first share of the permuted query data and a masked version of the first share of the permutation matrix, wherein the transmission enables the second device to generate a second share of the fully permuted query data, and wherein the generation is further based on the second share of the permuted query data and the second share of the permutation matrix;

receiving, by the first device, a second seed from the third device, wherein the second seed is used for computing first shares of thresholds associated with a set of non-leaf nodes of a first share of a permuted decision tree, and wherein second shares of the thresholds associated with a set of corresponding non-leaf nodes of a second share of the permuted decision tree are received by the second device from the third device;

receiving, by the first device, a second share of a classification result from the second device, wherein the second share of the classification result is generated based on outcomes of secure comparison operations, and wherein the second device performs the secure comparison operations based on masked versions of each of the second shares of the thresholds associated with the set of corresponding non-leaf nodes, the second share of the fully permuted query data, the first shares of the thresholds associated with the set of non-leaf nodes, and the first share of the fully permuted query data;

receiving, by the first device, outcomes of the secure comparison operations from the second device;

generating, by the first device, a first share of the classification result based on the outcomes of the secure comparison operations; and generating, by the first device, a decision tree classification result based on the first share of the classification result and the second share of the classification result.

15. A system comprising:

a first device comprising a first processor;

a second device comprising a second processor; and a third device comprising a third processor, the third processor configured to:

transmit an attribute sequence vector to the first device to enable the first device to generate a permuted query data;

transmit a first share of a permutation matrix to the first device and a second share of the permutation matrix to the second device, wherein the third device applies an additive secret sharing on the permutation matrix leading to a splitting of the permutation matrix into the first share of the permutation matrix and the second share of the permutation matrix;

obtain a permuted decision tree, wherein each non-leaf node of the permuted decision tree includes an attribute and a threshold;

split the permuted decision tree into a first share of the permuted decision tree and a second share of the permuted decision tree;

transmit a second seed to the first device to enable the first device to compute first shares of thresholds associated with a set of non-leaf nodes of the first share of a permuted decision tree;

and transmit the second share of the permuted decision tree to the second device, wherein non-leaf nodes of the second share of the permuted decision tree include second shares of the thresholds and attributes associated with the non-leaf nodes, and wherein leaf nodes of the second share of the permuted decision tree include labels, wherein the first processor is further configured to apply additive secret sharing on the permuted query data to split the permuted query data into two parts, wherein the split leads to the generation of the first share of the permuted query data and the second share of the permuted query data.

* * * * *